US010062108B2

(12) United States Patent
Mulhim

(10) Patent No.: US 10,062,108 B2
(45) Date of Patent: Aug. 28, 2018

(54) MOBILE REMITTANCE COMPUTER SYSTEM AND METHOD

(75) Inventor: Hazem Mohamed Mulhim, Dubai (AE)

(73) Assignee: EASTNETS FZ-LLC, Dubai (AE)

(*) Notice: Subject to any disclaimer, the term of this patent is extended or adjusted under 35 U.S.C. 154(b) by 0 days.

(21) Appl. No.: 13/071,788

(22) Filed: Mar. 25, 2011

(65) Prior Publication Data
US 2011/0258115 A1 Oct. 20, 2011

(51) Int. Cl.
G06Q 40/00 (2012.01)
G06Q 40/02 (2012.01)
G06Q 20/10 (2012.01)
G06Q 20/32 (2012.01)
G06Q 20/38 (2012.01)

(52) U.S. Cl.
CPC ............ G06Q 40/02 (2013.01); G06Q 20/10 (2013.01); G06Q 20/108 (2013.01); G06Q 20/3223 (2013.01); G06Q 20/381 (2013.01)

(58) Field of Classification Search
CPC ........ G06Q 40/00; G06Q 40/02; G06Q 40/04; G06Q 40/06
USPC .......................................................... 705/42
See application file for complete search history.

(56) References Cited

U.S. PATENT DOCUMENTS

| 7,742,985 B1 * | 6/2010 | Digrigoli et al. ............... 705/39 |
| 2003/0236726 A1 * | 12/2003 | Almonte et al. ................ 705/35 |
| 2006/0089894 A1 * | 4/2006 | Balk ...................... G06Q 40/00 705/35 |
| 2007/0179885 A1 * | 8/2007 | Bird ...................... G06Q 20/04 705/39 |
| 2007/0198432 A1 | 8/2007 | Pitroda et al. |
| 2008/0249910 A1 | 10/2008 | Hill et al. |
| 2008/0294551 A1 | 11/2008 | Degenhart et al. |
| 2009/0070257 A1 * | 3/2009 | Csoka ................... G06Q 20/10 705/39 |
| 2009/0119190 A1 | 5/2009 | Realini |
| 2009/0144193 A1 * | 6/2009 | Giordano ............... G06Q 20/04 705/39 |

(Continued)

FOREIGN PATENT DOCUMENTS

GB 2467530 A * 2/2009

OTHER PUBLICATIONS

KYC definition by Webopedia.*

(Continued)

Primary Examiner — Hai Tran
(74) Attorney, Agent, or Firm — Staas & Halsey LLP

(57) ABSTRACT

A computer system that executes a mobile device financial institution and/or financial regulatory compliant, for example, SWIFT and AML/CFT compliant, remittance across borders of countries by generation, at a mobile device via a mobile device service operator interface of a mobile network operator in a first country, of a remittance transaction based upon a remittance amount and a mobile device number of a remittance sending user. The remittance transaction is transmitted, via the mobile device service operator interface, to a mobile device remittance service computer. The mobile device remittance service computer transmits via a money manager interface the remittance transaction to a money manager in a second country for remittance to a remittance beneficiary.

6 Claims, 35 Drawing Sheets

(56) References Cited

U.S. PATENT DOCUMENTS

| | | | | |
|---|---|---|---|---|
| 2009/0299901 | A1* | 12/2009 | Garcia | G06Q 20/1085 705/43 |
| 2010/0211499 | A1* | 8/2010 | Zanzot et al. | 705/40 |
| 2011/0320347 | A1* | 12/2011 | Tumminaro et al. | 705/39 |
| 2012/0022065 | A1* | 1/2012 | Bannen | A61K 31/47 514/235.2 |

OTHER PUBLICATIONS

Know Your Customer (KYC) Norms and Anti-Money Laundering AML) Standards, Guidance Notes for Banks, Indian Banks' Association, Jul. 2009.*

Zain,Western Union announce alliance to deliver cross-border mobile money transfer services to Zap subscribers in Africa, Middle East, Wireles Federation.com News, Jun. 23, 2009.*

Zain brings mobile banking to over 100 million East Africans, WirelessFederation.com News, Sep. 23, 2009.*

Startup Touts Mobile Cash Transfer, Spangler, T., Interactive week, Sep. 1999.*

Obopay Blog, 2009-2010.*

Implementation of mobile money transfer ICT Report Jun. 2009.*

Business Message Standard (BMS) for Pay/Financial Institution Control Totals BRG: Pay 2005.*

A Business Plan to Advance Animal Traceability 2008.*

Business Message Standard (BMS) Settlement 2007.*

The GS1 Traceability Standard: What you need to know 2007.*

Mobile Payments Business Models, Agrawal, M., Telecom Circle3 30 2009.*

Written Opinion of the International Searching Authority dated Oct. 18, 2011 in corresponding International Patent Application No. PCT/IB 11/01094 (6 pages).

PCT International Search Report dated Oct. 18, 2011 in corresponding International Patent Application No. PCT/IB 11/01094 (10 pages).

Extended European Search Report dated Dec. 5, 2014 in corresponding European Application No. 11758891.3 (5 pages).

* cited by examiner

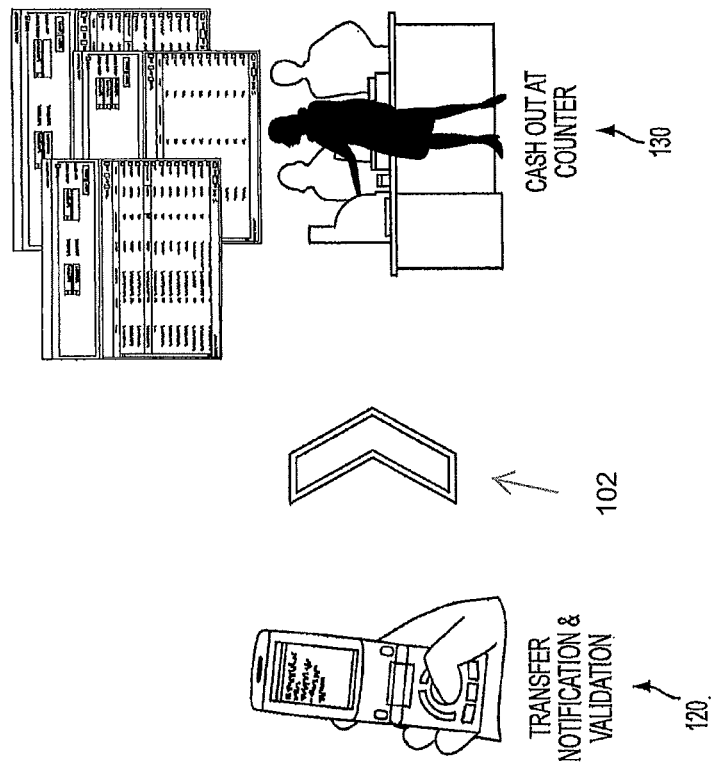
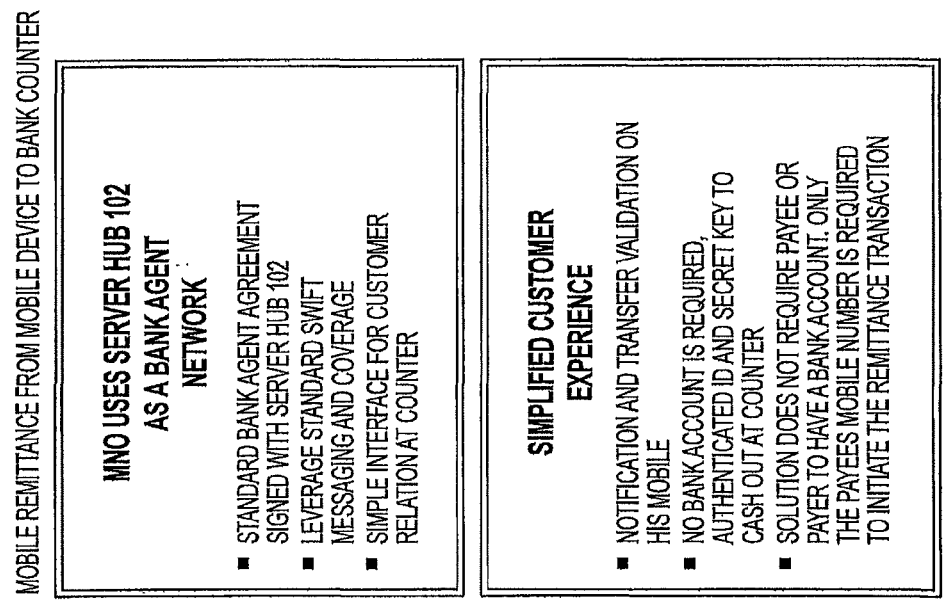
FIG. 1B

MANAGE GSM OPERATORS

SEARCH
OPERATOR NAME: [SELECT OPERATOR... ▾]   LOCAL CURRENCY: [SELECT A CURRENCY... ▾]
OPERATOR CODE:                            OPERATOR COUNTRY: [SELECT A COUNTRY... ▾]

[SEARCH]  [CLEAR]

☐ NEW | ⟲ EDIT | ✖ DELETE

| | NAME | CODE | LOCAL CURRENCY | COUNTRY | FTP LOCATION | SHARE % | EMAIL | EXPIRATION PERIOD |
|---|---|---|---|---|---|---|---|---|
| ☐ | BICS | BICS-JO | JOD | JORDAN | ftp://gsm/BICSSidPF/ | 6 | JMAD@COM | 20 |
| ☐ | DU | DU-AE | USD | UNITED ARAB EMIRATES | ftp://moredemo/CoreF... | 6 | AHTH@COM | 20 |
| ☐ | UMNIAH | UMNIAH-JO | JOD | JORDAN | ftp://gsm/SMPFFile/ | 7 | SN@COM | 20 |
| ☐ | ZAIN | ZAIN-JO | JOD | JORDAN | ftp://gsm/SMPFFile/ | 5 | AHH@COM | 10 |

↙ 170

◁ PAGE: [1] OF 1 ▷ ▷| ↻

|◁ ◁                                                                                      DISPLAYING 1-4 OF 4

MANAGE EXCHANGE RATE

SEARCH
FROM CURRENCY: SELECT A CURRENCY...
TO CURRENCY: SELECT A CURRENCY...
EXCHANGE RATE DATE:

[SEARCH] [CLEAR]

610

☐ | NEW | ✎ EDIT | ✖ DELETE

| | FROM CURRENCY | TO CURRENCY | EXCHANGE RATE | DATE |
|---|---|---|---|---|
| ☑ | USD | JOD | 0.7 | 10/10/2010 |
| ☐ | USD | JOD | 1.2 | 12/21/2010 |
| ☐ | USD | JOD | 0.71 | 02/24/2011 |

|◁ ◁ PAGE 1 OF 1 ▷ ▷| ⟳  DISPLAYING 1-3 OF 3

FIG. 18

MANAGE BANKS

SEARCH
BANK NAME: [          ]   BANK CURRENCY: [SELECT A CURRENCY... ▾]
BANK CODE: [          ]   BANK COUNTRY:  [SELECT A COUNTRY... ▾]
BANK BIC:  [          ]

[SEARCH] [CLEAR]

☐ NEW | ⤴ EDIT | ✗ DELETE

| | NAME | CODE | BIC | SHARE % | CURRENCY | COUNTRY | CREATION DATE |
|---|---|---|---|---|---|---|---|
| ☐ | JORDAN BANK | BOJO-JO | BOJO-AMXXXX | 15 | JOD | JORDAN | 09/28/2010 |
| ☐ | HABIB BANK | HBL-VN | HBLXXXXXXXX | 2 | USD | VIET NAM | 03/16/2011 |
| ☐ | HSBC BANK | HSBC-JO | HSBCJOAMXXX | 10 | JOD | JORDAN | 09/28/2010 |

PAGE [1] OF 1  ▷ ▷|  ⟲

DISPLAYING 1-3 OF 3

MONITORING SCREEN

SEARCH

| BANK FILE NO.: | | TRANS. REF NO.: | |
|---|---|---|---|
| FROM AMOUNT: | | TO AMOUNT: | |
| FROM TRANSACTION DATE: | 03/17/2010 | TO TRANSACTION DATE: | 03/17/2011 |
| SUBSCRIBER NAME: | | BENEFICIARY NAME: | |
| TRANSACTION STATUS: | SELECT TRANSACTION STATUS... ▼ | | |

[SEARCH] [CLEAR]

TRANSACTION HISTORY

| | BANK FILE NO | TRANS. REF. NO | AMOUNT | CURRENCY | SUBSCRIBER | BENEFICIARY | TRANS. DATE | STATUS |
|---|---|---|---|---|---|---|---|---|
| ☑ | 21 | 1123691744 | 1,512 | JOD | SUFYAN JABR | SOFYAN TEST 002 | 10/05/2010 | PAID |
| ☐ | 76 | 1183916654 | 1,512 | JOD | SUFYAN JABR | TEST4 SAID | 03/13/2011 | UNPAID |
| ☐ | 87 | 1183916656 | 1,512 | JOD | SUFYAN JABR | MONA3 | 03/16/2011 | PAID |
| ☐ | 77 | 1183982190 | 1,512 | JOD | SUFYAN JABR | TESTMONA SAID | 03/13/2011 | UNPAID |
| ☐ | 78 | 1184309969 | 1,512 | JOD | SUFYAN JABR | TESTMONA3 | 03/13/2011 | CANCELLATION REJECTED |
| ☐ | 78 | 1184375405 | 1,512 | JOD | SUFYAN JABR | TESTMONA4 | 03/13/2011 | CANCELLATION REJECTED |
| ☐ | 77 | 1184440941 | 1,512 | JOD | SUFYAN JABR | TESTMONA2 SAID | 03/13/2011 | EXPIRED |
| ☐ | 85 | 1184572016 | 1,512 | JOD | SUFYAN JABR | MONA 1 | 03/16/2011 | WAITING FOR PAYMENT |

PAGE 1 OF 12    DISPLAYING 1-11 OF 126

FIG. 22

BANK REMITTANCE LIST

660 →

SEARCH

BANK FILE NO: _____
FROM AMOUNT: _____
FROM TRANSACTION DATE: 03/17/2010
SUBSCRIBER NAME: _____

TRANS. REF NO: _____
TO AMOUNT: _____
TO TRANSACTION DATE: 03/17/2011
BENEFICIARY NAME: _____

[SEARCH] [CLEAR]

| | BANK FILE NO | TRANS. REF NO | AMOUNT | CURRENCY | SUBSCRIBER | BENEFICIARY | TRANS. DATE | STATUS |
|---|---|---|---|---|---|---|---|---|
| ☑ | 78 | 184309869 | 1,512 | JOD | SUFYAN JABR | TESTMONA3 | 03/13/2011 | CANCELLATIONREJECTED |
| ☐ | 78 | 184375405 | 1,512 | JOD | SUFYAN JABR | TESTMONA4 | 03/13/2011 | CANCELLATIONREJECTED |
| ☐ | 85 | 184572016 | 1,512 | JOD | SUFYAN JABR | MONA1 | 03/16/2011 | WAITINGFORPAYMENT |
| ☐ | 81 | 184637549 | 1,512 | JOD | SUFYAN JABR | SOMEONE | 03/14/2011 | WAITINGFORPAYMENT |
| ☐ | 86 | 184637552 | 1,512 | JOD | SUFYAN JABR | MONA2 | 03/16/2011 | WAITINGFORPAYMENT |
| ☐ | 79 | 184703085 | 1,512 | JOD | SUFYAN JABR | TESTMONA4 | 03/13/2011 | WAITINGFORPAYMENT |
| ☐ | 70 | ENS1121751297 | 590 | JOD | JASER AHMAD JASER M... | SALIM | 03/10/2011 | WAITINGFORPAYMENT |
| ☐ | 66 | ENS1121947902 | 590 | JOD | JASER A. MAHMOUD | SUFYAN SALEEM ABDU A... | 03/09/2011 | WAITINGFORPAYMENT |
| ☐ | 80 | ENS1121947904 | 590 | JOD | JASER AHMAD JASER M... | SALIM | 03/14/2011 | WAITINGFORPAYMENT |

PAGE 1 OF 2     DISPLAYING 1-11 OF 16

FIG. 23

| | TRANS. REF. NO | STATUS | CREATION DATE |
|---|---|---|---|
| ☑ | S90018218 | WAITINGFORCANCELLATION | 10/09/2010 |
| ☐ | S967931610 | WAITINGFORCANCELLATION | 10/09/2010 |
| ☐ | DEMO-003 | WAITINGFORCANCELLATION | 10/09/2010 |
| ☐ | S1526215091 | WAITINGFORCANCELLATION | 10/18/2010 |
| ☐ | 8362106600 | WAITINGFORCANCELLATION | 10/20/2010 |
| ☐ | S224482477 | WAITINGFORCANCELLATION | 10/20/2010 |
| ☐ | S44863921 | WAITINGFORCANCELLATION | 02/27/2011 |

MOBILE REMITTANCE COMPUTER SYSTEM AND METHOD

CROSS-REFERENCE TO RELATED APPLICATIONS

This application is related to, and claims the benefit of priority to, U.S. Provisional Application Nos. 61/282,761, filed Mar. 26, 2010 and 61/344,327, filed Jun. 29, 2010, in the U.S. Patent and Trademark Office, by Hazem Mulhim, the contents of which are incorporated herein by reference.

BACKGROUND

1. Field

The embodiments of the present invention relate to a mobile remittance computer system and method thereof.

2. Description of the Related Art

Alternative payment remittance solutions are spreading globally where instead of using traditional Person-to-Person (P2P) remittance service provider, customers can use a mobile phone to effect remittance.

SUMMARY

There is a need for mobile remittance based on a rich set of functions for the fast growing low value payments for cross border of country remittances. However, the embodiments of the invention are not limited to low value payments and can be provided for any value payments for cross border of country remittances should laws and regulations allow the same.

A computer system is provided that executes a mobile device financial institution and/or financial regulatory compliant, for example, SWIFT and AML/CFT compliant, remittance across borders of countries by generation, at a mobile device via a mobile device service operator interface of a mobile network operator in a first country, of a remittance transaction based upon a remittance amount and a mobile device number of a remittance sending user. The remittance transaction is transmitted, via the mobile device service operator interface, to a mobile device remittance service computer provided according to the embodiments of the present invention. The mobile device remittance service computer transmits via a money manager interface the remittance transaction to a money manager (e.g., financial institution) in a second country that is governed by financial institution regulations for remittance to a beneficiary.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 1B and 1C are diagrams of workflows, according to an embodiment of the invention.

FIGS. 17-24 are user interface computer display screens of the mobile device remittance computer system, according to an embodiment of the invention.

Figure 25A:
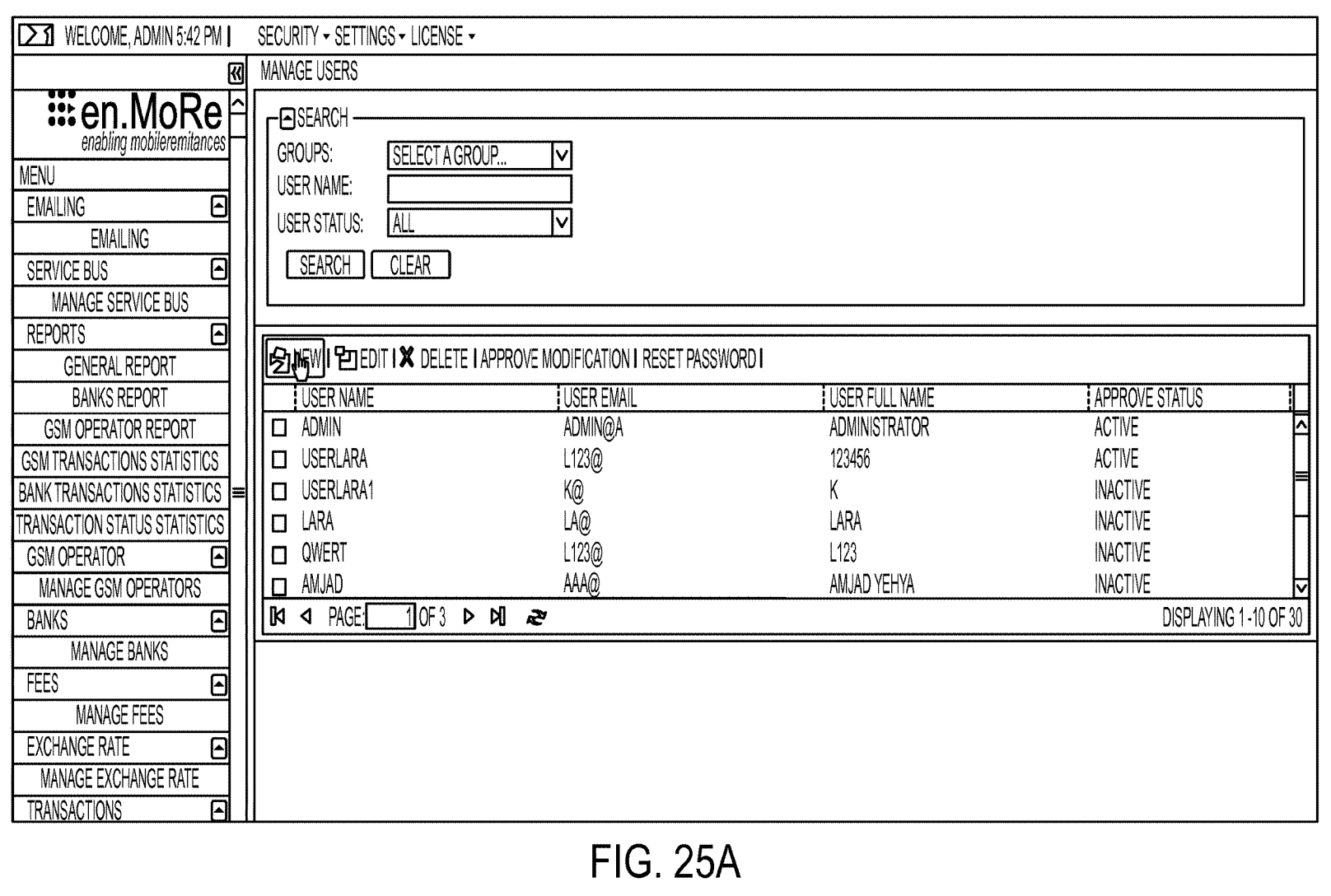

FIGS. 25A-25D are user interface computer display screens for managing administrative users of the mobile device remittance computer system, according to an embodiment of the invention.

DETAILED DESCRIPTION OF THE PREFERRED EMBODIMENTS

Figure 1A:
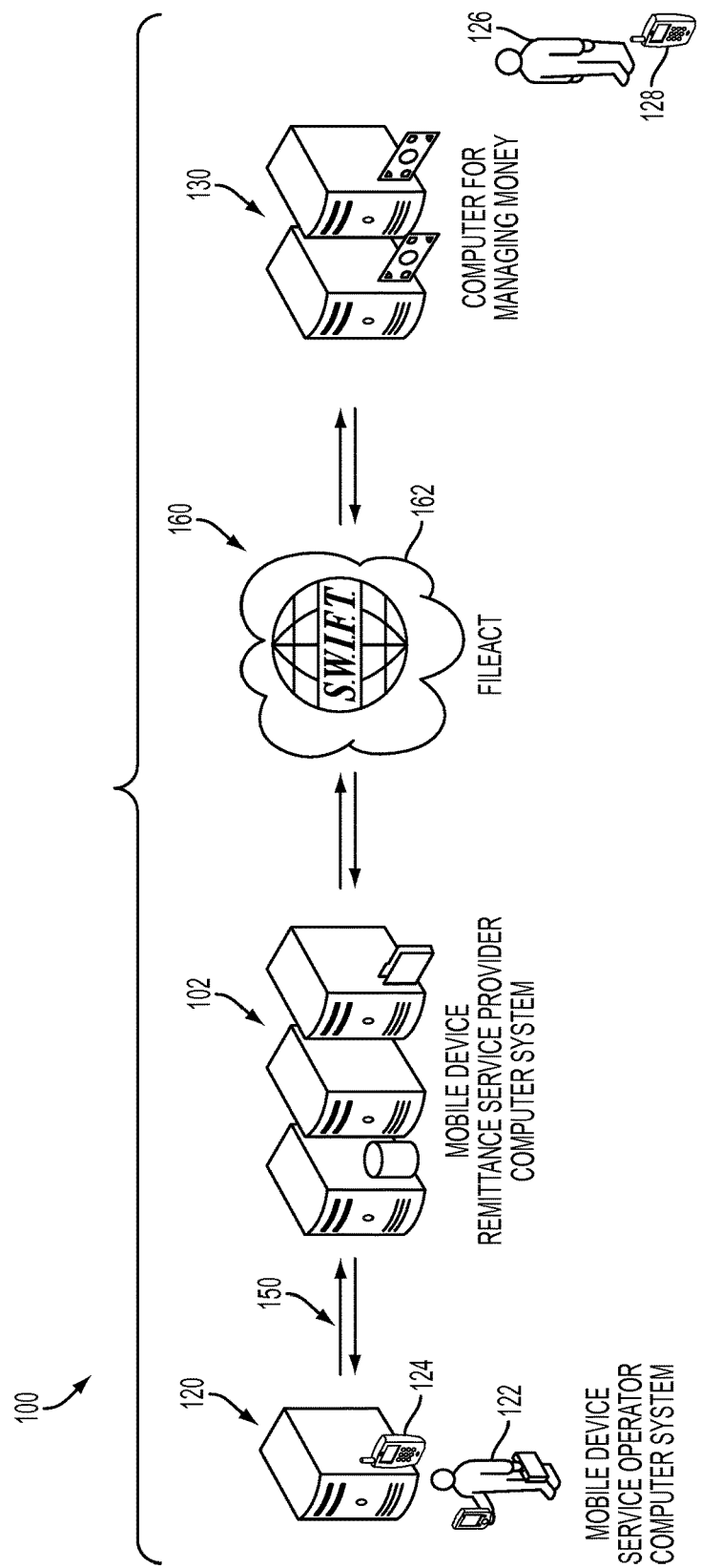
FIG. 1A is a diagram of a mobile device remittance computer system according to an embodiment of the invention.

FIG. 1A is a diagram of a mobile device remittance computer system according to an embodiment of the invention. In FIG. 1A, according to an aspect of an embodiment of the invention, a method and computer system that remits (i.e., transfers or sends money from a sender to a recipient at a distance or from one place to another) is provided in form of a Web based computer system 100 (also referred herein as mobile device remittance computer system 100 or by name as en.MoRe™ mobile device remittance computer system). The mobile device remittance computer system provides a mobile device (mobile) remittance service via a computer system of a mobile device remittance service provider (a remittance server hub) 102 (for example, by EASTNETS (EN or En) assignee of the instant application) and computer components (e.g., software and/or hardware) adopted in computer systems of the partaking entities, such as mobile device telephony/data service operators or Mobile Network Operators (MNO) 120, for example, a Global System for Mobile Communications (GSM) operator, which provides users 122 with mobile device 124 telephony/data services, and computer systems for managing (e.g., payment, dispensing, remitting, deposit, custody, loan) money (e.g., financial institution, bank, money deliverer and/or recipient, automatic teller machine, etc.) 130. According to an aspect of an embodiment, a money manager 130 is any computer system that complies with financial laws/regulations for international remittance, for example, in a first and/or second country involved in a remittance transaction, for example, the Society for Worldwide Interbank Financial Telecommunication (SWIFT). A user of the mobile device remittance computer system can refer to a Mobile Network Operator (MNO) 120 to be connected to the server hub 102, or an MNO 120 subscriber 122 who wants to remit to a beneficiary 126, or a money manager 130 that manages payment of money to a beneficiary 126 of the remittance transaction (e.g., a bank 130 completes the remittance transaction when the bank 130 pays cash to a beneficiary 126 of the remittance transaction and reflects a completed remittance status in the mobile device remittance computer system).

References to the mobile device user/customer 122, 126 (can include a mobile device 124, 128), the mobile device service operator 120, the mobile device remittance service provider 102 and the money manager 130, refer to computers (physical computing hardware or machinery) that implement or execute by way of software, which is code executed by computing hardware, and/or by way of computing hardware (e.g., in circuitry, etc.), the functions or operations being described. The functions of embodiments described can be implemented in any type of computer. More particularly, programming of a computer to execute the described functions of embodiments of the invention creates a new machine where a general purpose computer in effect becomes a special purpose computer once it is programmed to perform particular functions of the embodiments of the invention pursuant to instructions from program software.

The mobile remittance computer system 100 enables mobile device remittance (also referred to as mobile device money transfer or payment) through one or more of Short Message Service (SMS), USSD string or Java applet request or a mobile web based request, by providing a mechanism and a pre-defined schema to receive transactions from GSM operators 120 and then to pass the remittance (e.g., money, payment) transactions to the receiving or target money manager (e.g., banks) 130. When referring to a computer system of the mobile device service operator 120, a mobile device 124 can be included.

The described embodiments use a bank as an example of a computer system for a money manager. The described embodiments may refer to a mobile device service operator 120 as a GSM operator, however, the embodiments are not limited to GSM type mobile device service operators. The data communication network 150 between the mobile device service operators 120 and the computer system of the mobile device remittance service provider 102, and the data communication network 160 between the computer system of the mobile device remittance service provider 102 and the computer system of the money manager 130 can be any type of wire and/or wireless data communication network and according to any data communication protocol (e.g., Internet, etc.). According to an aspect of an embodiment, the mobile device remittance service provider 102 uses a SWIFT FileAct communication channel 162 with the bank 130.

Figure 1C:
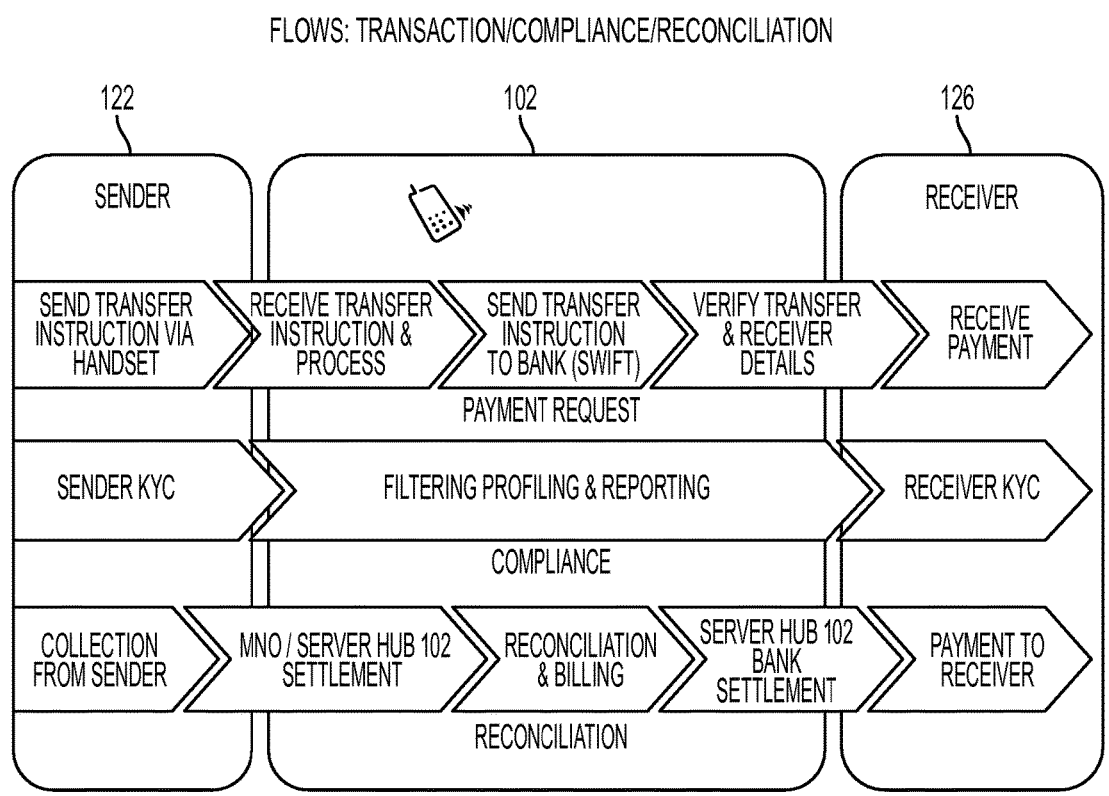

FIGS. 1B and 1C are diagrams of workflows, according to an embodiment of the invention. According to an aspect of an embodiment, a method and computer system of providing an alternative to non-bank agents for cash in/cash out (remittance) at the counter that accommodates non-bankers, such as low-income individuals, migrants, tourists, or persons in remote geographical areas or countries (unbanked person community, person-to-person community) to execute a remittance transaction, while subjecting a remittance transaction to countries financial regulatory laws and/or obligations, security, privacy and risk requirements/obligations (collectively referred to as remittance legal and computer interface burden or obligation) and reducing the remittance legal and computer interface burden on a third party non-bank agent that has service subscription access to the unbanked community, for example, a mobile device network operator (MNO) 120. According to an aspect of an embodiment, the MNO 120 signs a mobile device remittance service agent agreement with a mobile device remittance service provider 102 that has financial computer interface access (e.g., SWIFT 160) in a plurality of countries or jurisdictions. The bank agent agreement provides a contractual relationship between the MNO 120 and the mobile device remittance service provider 102 (for access to the server hub (mobile device remittance service bureau) 102's mobile device remittance service computer interface). The mobile device remittance service provider 102 signs a contract with the banks 130. Therefore, the relationship between the MNO 120 and bank 130 is not a direct relationship, but an indirect via the server hub 102 to a bank 130 relationship without requiring a bank account by the MNO 130. In other words, for example, while the MNO 120 signs a service bureau agent agreement with the server hub 102, the MNO 120 does not have to comply with financial regulation that govern establishment and management of a bank account for bank account holders. Since the server hub 102 can centrally provide financial regulatory and financial industry computer interface compliance for the MNO 120, changes and compliance thereto to the financial regulation and computer interface are centrally effected at the server hub 102 and/or at the data structures 400, 402, and 404.

According to an aspect of an embodiment, data structures 400, 402, 404 are established by the service hub 102 among the sending MNO 120, the server hub 102 and a bank 130, where the data structures are a current representation of remittance legal and computer interface burden for the MNO 120 by including one or more of authenticated MNO subscriber name according to KYC standard, a remittance amount subject to a certain threshold, remittance occurrence subject to a certain threshold, sending MNO subscriber mobile device number, beneficiary MNO subscriber mobile device number, remittance transaction security code, local currency and destination currency, and target bank information for the remittance beneficiary that is recognized/approved within the financial industry. According to an aspect of an embodiment, the target bank 130 can be approved on remittance transaction basis. The data structure 400, 402, 404 is dynamic by allowing changes on a country by country and/or financial regulation basis. The financial regulatory compliance obligation of the MNO 120 is dynamic as well as automatic based upon the data structures 400, 402, 404 via validation, remittance transaction filtering, profiling and reporting of/on MNO 120, authenticated MNO subscriber name, sender mobile device number, target bank for remittance to beneficiary, beneficiary mobile device number and remittance transaction details basis. According to an aspect of an embodiment, liability boundaries for a remittance among the MNO 120, the server hub 102 and the bank 130 is maintained and/or can by dynamically shifted along the financial regulatory burden continuum (see FIG. 10E) based upon configuration of the data structures 400, 402, 404 and via validation, filtering, profiling and reporting of/on MNO 120, authenticated MNO subscriber name, sender mobile device number, target bank for remittance to beneficiary, beneficiary mobile device number and/or remittance transaction details basis. For example, the data structures 400, 402 and 404 include financial regulatory compliance such as AML, CFT, etc., status information (warnings, yes, no, etc.) as associated with a mobile device number.

The following financial regulations and/or financial industry computer interfaces referred to by the following terminology may be used: FATF (Financial Action Task Force) or other organizations that issue guidance, recommendations, policies, etc., on financial transaction, (AML (Anti Money Laundering), CFT/CTF (Countering the Financing of Terrorism/Counter-Terrorism Financing), ARS (Alternative Remittance Systems), CDD (Customer Due Diligence), CTR (Cash Transaction Report), FATF 40+9 (FATF 40 Recommendations and 9 Special Recommendations), FI (Financial Institution), FIU (Financial Investigation Unit), KYC (Know Your Customer), and ML (Money Laundering). The remittance legal and computer interface burden can involve one or more of the above regulations and collectively referred to as financial regulatory burden or obligation.

Figure 2:
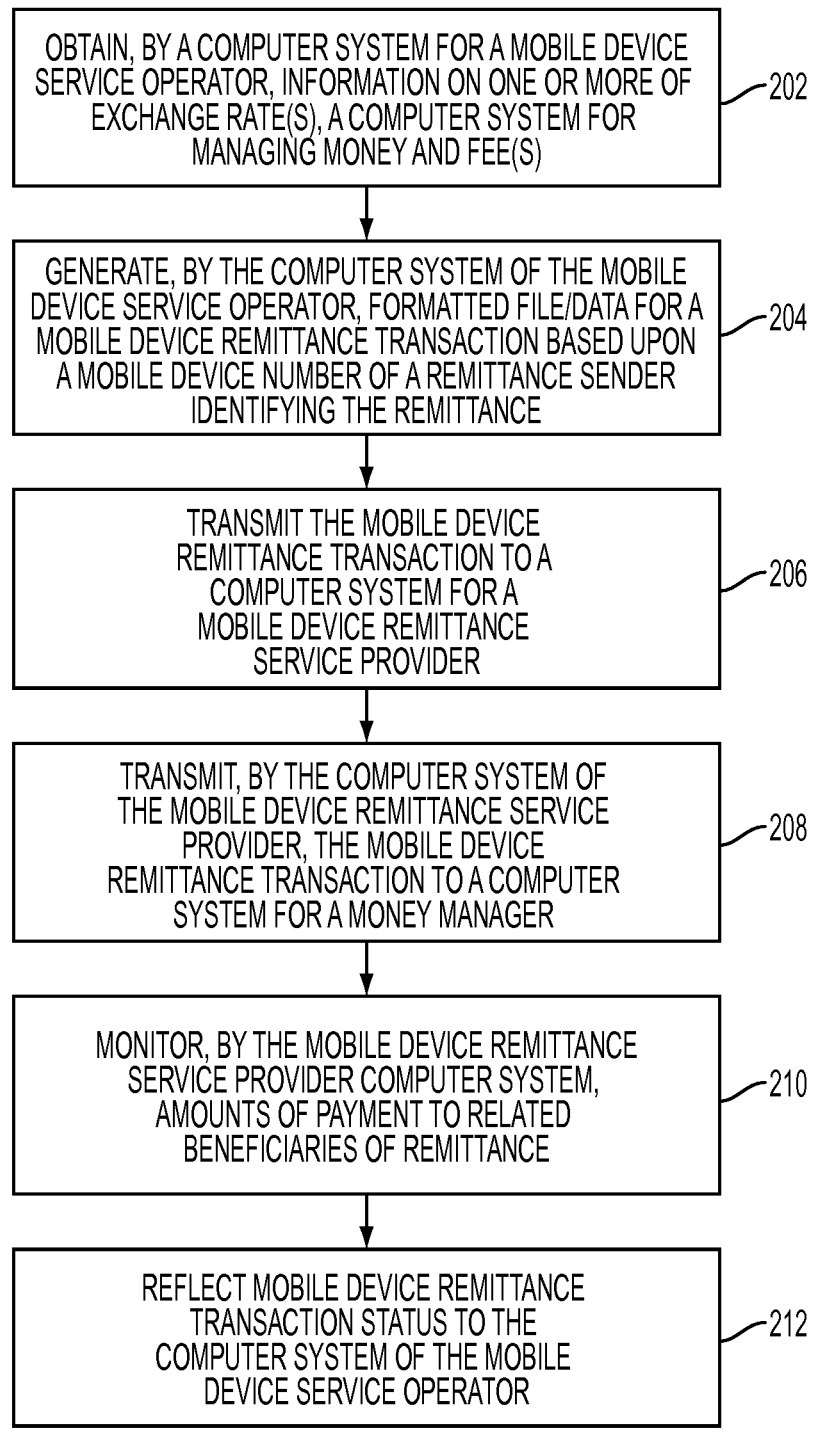
FIG. 2 is a flow chart of remittance via mobile devices, according to an embodiment of the invention.

FIG. 2 is a flow chart of remittance via mobile devices, according to an embodiment of the invention. At 202, a computer system for a mobile device telephony/data service operator 120 obtains information about one or more of exchange rate(s), a computer system for managing money 130 and fee(s). At 204, formatted file/data for a mobile device remittance transaction is generated by the computer system of the mobile device service operator 120. In particular, at 204, at a mobile device via the mobile device service operator interface, a remittance transaction is generated based upon a remittance amount and a mobile device number of a sending user. At 204, a security code 300 is generated with which a beneficiary 126 of a remittance can claim the remittance. According to an aspect of an embodiment, the MNO does not have access to the remittance transaction data, except for KYC data. In other words, for example, the MNO 120 only has access to the KYC data for initiating the remittance transaction, and the MNO 120 does not have access to the security code 300 (also referred to as transaction reference number information 300) including the beneficiary bank code, the remittance amount, destination currency, local and/or destination currency, currency exchange rate, thereby preserving the confidentiality and/or privacy of information of the sending subscriber 122, reducing the MNO's financial legal burden and/or preserving the boundaries of remittance liability according to data structures 400, 402 and 404. At 206, a mobile device remittance transaction is transmitted to a computer system for a mobile device remittance service provider 102. At 208, the computer system of the mobile device remittance service provider 102 transmits a remittance transaction to a computer system for a money manager 130. In particular, at 208, the mobile device remittance service computer, converts the remittance transaction into a money manager computer interface compliant transaction and transmits, via the money manager interface, the remittance transaction to the money manager. At 210, the mobile device remittance service provider computer system 102 monitors amounts of payment to related beneficiaries of the remittance, and at 212 remittance transaction status is reflected or provided to the computer system of the mobile device service operator 120.

The computer system for mobile remittance 100 also known as en.MoRe™ mobile remittance computer system is a single and rapidly-adopting alternative remittance solution which can spread globally. Customers of MNO 120 can use mobile phone to remit money. According to an aspect of an embodiment, mobile payment focuses on a rich set and fast growing low value payments for cross border remittances.

According to an aspect of an embodiment, transaction workflows are integrated starting from GSM operators 120 and ending at beneficiary's correspondent banks 130. The details of how the system can fulfill these needs will be detailed herein. The mobile remittance 100 computer implemented components vary between web services, windows services, web based modules, USSD, Java Applet and mobile HTML, making it easy to use the product through a browser from virtually any location.

The following is list of glossary used:

MPF: mobile payment file format; it is a standard well-defined format for the mobile remittance 100 that will be the main media to communicate transactions between mobile device remittance service provider 102 and the GSM operators 120.

AML: Anti Money Laundry.

Redemption Currency: the currency used by the money manager (e.g., bank) to pay to/for beneficiary.

Local currency: the local currency of the country where the GSM 120 operates.

The following mobile remittance 100 features are provided:

1. Mobile remittance service provider 102 provides a mechanism to receive a file from GSM operator 120 that contains all the needed information for money transfer, so that system can do the needed remittance transfer within minimal cost and efforts.

2. Mobile remittance service provider 102 logs substantially all the transactions received/executed; so that system can keep track of each transaction 3. Mobile remittance service provider 102 can generate needed reports from the log, reports may be used in the settlements and reconciliations.

4. Mobile remittance service provider 102 can monitor transaction owner's behavior, so as to eliminate money laundry, fraud and financial crimes. According to an aspect of an embodiment, the system 100 will use the customer information obtained during registration process with the MNO 120, and beneficiary mobile number instead of account number when doing transaction profiling. The transaction profiling will be used by the GSM operator 120, for example, to meet financial regulation compliance.

5. Mobile remittance service provider 102 receives the transactions amounts from GSM operators 120 in payout currency (default currency between remittance service provider 102 and GSM operator 120) and the needed redemption currency (which relates to a bank 130 of the beneficiary of the remittance).

6. Mobile remittance service provider 102 provides a money manager 130 (e.g., bank) interface that will be used by the beneficiary banks, this interface will provide a way to track, update and monitor any transaction.

7. Mobile remittance service provider 102 provides the bank interface with a list of reports needed for the settlements and reconciliation.

8. Mobile remittance service provider 102 sends the transactions to the bank (destination bank) 130 in redemption currency without communicating (without transmitting) the exchange rate used and the local currency and amount, thereby maintaining in confidence the exchange rate and/or the local currency and amount from the bank 130.

9. Mobile remittance service provider 102 provides a communication channel for the GSM operator 120 to update the exchange rate on a daily basis. The submission of the exchange rate can be manual and/or automatic.

The mobile remittance service provider 102 includes two parts that handle the mobile remittance process structure, namely computer system components of a remittance service provider 102 include a mobile device service operator interface and a money manager interface.

Mobile device service operator interface:

The mobile device service operator 120 (e.g., GSM operator) interface handles the transaction between the GSM operator(s) and the corresponding bank(s) 130. The mobile remittance service provider 102 receives the GSM transactions in a MPF file using, for example, a secured communication channel layer or a secure file transfer. According to an aspect of an embodiment, the MPF file is an XML file format. According to an aspect of an embodiment, this part will hold the following functionality:

1. Currency Exchange Rate: Mobile remittance service provider 102 will provide the exchange rates on daily basis; exchange rates will be local currency vs. redemption currency. These rates will be used for currency exchange transactions in that day. It will be loaded automatically. If the remittance service provider finance team wish to upload it manually, or should the automatic upload fail, the solution leaves a room for manual update by utilizing custom screen to parse the file and save its content in the database.

2. Transaction segregation: Mobile remittance service provider 102 will provide the mechanism needed to parse the MPF file that has been received from the GSM operator 120 to segregate the remittance transaction as per destination bank 130 and then send the remittance transaction to the target bank 130 using the FileAct 162.

3. Transaction Validation: Mobile remittance service provider 102 will provide predefined rules that will be applied on the remittance transactions parsed on the segregation operation, transactions with incorrect or incomplete data will be rejected directly and notify the GSM operator 120. The validation will check one or more of the following: (the listed validation may increase depending on business needs):
   a. The total transaction amount v/s. summation of transactions amounts
   b. Beneficiary bank 130 vs. the GSM operator 120
   c. Number of transactions in the file v/s the total number of the transactions in the file's footer 4. Transaction Logger: Mobile remittance service provider 102 will log every GSM transaction sent through MPF in a database for detailed follow up and will update the status of each transaction separately depending on the status come from the bank or as a result of validation process. Each transaction should be logged for future reporting, reconciliation and settlement.

5. Transaction Filtration: Mobile remittance service provider 102 will filter the MPF files depending on the beneficiary bank, since the MPF files that have been received by the GSM operator are not filtered by the Beneficiary bank 130.

6. The MPF filtered file will be sent to the Bank Interface through SWIFT FileAct.

7. Transaction Status Modifier: Mobile remittance service provider 102 has the ability to update the transaction after the bank notifies it with the new status changed through FileAct. The GSM operator 120 will receive the updated status in XML format through a secured FTP provided by the system.

Money Manager Interface

This interface is provided by the mobile remittance service provider 102 to be used within the computer systems of money managers 130 (e.g., beneficiary banks) and is compliant with SWIFT with respect to both formatting and communication line. It will give the bank users the capability to query, update and monitor the remittance transactions, and will provide an easy way to generate reports needed by the bank, such as delivered remittance transactions, pending transactions, update functions. In addition, the money manager computer system 130 will generate a new transaction status file on the mobile remittance transactions and send it status in the opposite direction through FileAct or secure FTP to the mobile remittance service provider 102 and then to the mobile device service operator 120.

Figure 3:
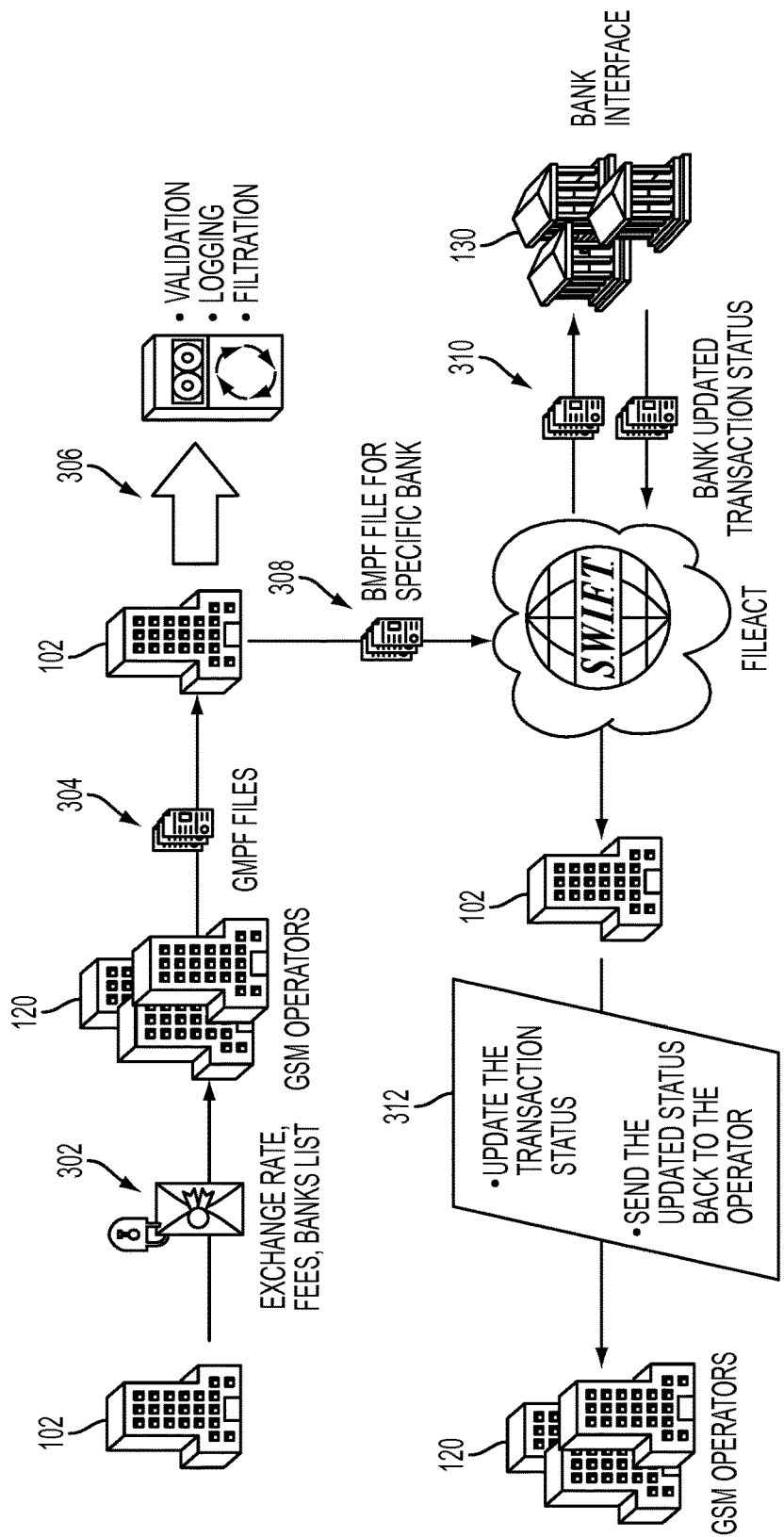
FIG. 3 is a data flow diagram of a business computer system for providing a mobile device remittance service, according to an embodiment of the invention.

FIG. 3 is a data flow diagram of a business computer system for providing a mobile device remittance service, according to an embodiment of the present invention. The following is the data flow diagram for en.MoRe™ mobile device remittance starting from at 302 sending the exchange rate and ending by the mobile device remittance service provider 102 notifying the GSM operator 120. As shown in FIG. 3, at 302, the mobile device remittance service provider 102 sends the exchange rate file to the operator 120, later, at 304, the GSM 120 will send the MPF file (GMPF) to the mobile device remittance service provider 102, which, at 306, will validate the transactions and log it to the DB. After that operation, at 308, the mobile device remittance service provider 102 will generate MPF for the corresponded banks (BMPF) 130 that uses the money manager interface. At 310, the bank 130 updates the mobile remittance transaction status, and then the bank 130 prepares a status file to be sent to the mobile device remittance service provider 102 through, for example, the FileAct. At 312, the mobile device remittance service provider 102 parses the file sent from the bank(s) 130 and updates the status of the original mobile remittance transaction and finally sends the status file back to the GSM operator 120.

Figure 4:
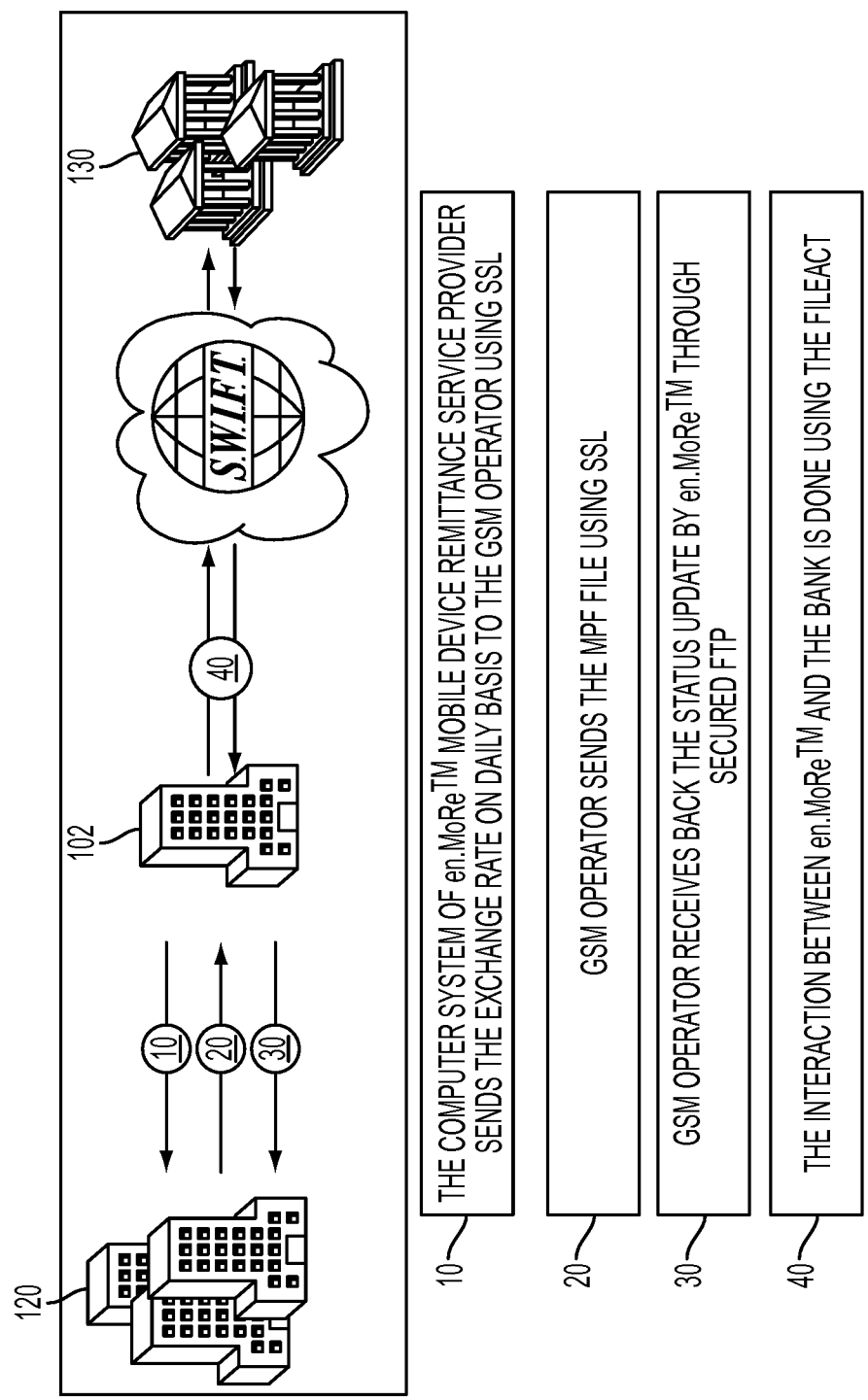
FIG. 4 is a diagram of data communication channels among the computer systems for mobile device remittance, according to an embodiment of the invention.

According to an aspect of an embodiment, the mobile device remittance service provider 102 will be the middle tier for the transaction done between the GSM operator 120 and the bank interface at the bank 130. The following are the description of connection channels between the other parties:

FIG. 4 is a diagram of data communication channels among the computer systems for mobile device remittance, according to an embodiment of the invention. Secured service layer (SSL) communication channels 10, 20 is provided for a secured connection channel between both the mobile device remittance service provider 102 and the GSM operator 120. The secured channel(s) 10 and 20 will be used to push currency exchange rates each day and send MPF from GSM 120 to the mobile device remittance service provider 102 in a pre defined time span. The mobile device remittance service provider 102 will provide a WCF (windows communication Foundation) secured by a certificate.

A secured File Transfer Protocol (FTP) communication channel 30 is used to send the Files back to the GSM operator 120 in a pre defined time span. GSM operator 120 checks the FTP files to update its transactions statuses according to the file sent by the mobile device remittance service provider 102.

The mobile device remittance service provider 102 uses the SWIFT FileAct communication channel 40 to send filtered transactions to the bank 130, which provides a security channel for the communication that ensure MFP delivery and security to the corresponded bank 130.

Since the mobile device remittance service provider 102 serves as a central point layer between the GSM operator 120 and the interface to the bank 130, it offers the following communication channels: SSL, FTP and Swift FileAct. The mobile device remittance service provider 102 provides a secured connection channel (e.g., SSL) between both the mobile device remittance service provider 102 and the GSM operator 120 to push one or more of currency exchange rates, fees and bank relationship data and send GMPF from GSM 120 to the mobile device remittance service provider 102.

The secured FTP communication channel is used by GSM operator 120 to receive back the status update by the mobile device remittance service provider 102. The mobile device remittance service provider 102 uses the SWIFT FileAct communication channel to send filtered BMPF to the bank 130, which provides a security channel for the communication that ensures BMPF delivery and security to the corresponding bank.

The work performed by two web services; Request for Cancellation and Exchange Rate are described.

Request for Cancellation Service web service. The mobile device remittance service provider 102 gives banks 130 a certain period of time during which they can reply for the forwarded transactions. Should the reply period elapses, mobile device remittance service provider 102 sends a request for cancellation to the delaying bank to call off the transaction processing. An active web service will keep monitoring over the transactions un-replied during the designated period; so that it collects them in a file and dispatches them to the interface of the bank 130; where concerned users can confirm or reject the cancellation request and change the transactions' status accordingly.

Exchange Rates web services: A daily web service will keep checking on the exchange rate table existing in the database, to send the exchange rates to GSMs 120 on a daily basis.

The computer system of the mobile device remittance service provider 102 has enough information logged within transactions log that enable it to generate as much as needed reports. Initially the following reports can be included:

End of day Activity report—detailed
End of day Activity report—summary
Bank End of day Activity report—detailed
Bank End of day Activity report—summary
Remittance destination reports per country/pre value/per mobile device service (e.g., GSM) operator
Audit reports for activities, black lists, . . . etc.

According to an aspect of an embodiment, the mobile device remittance service provider 102 will be able to send each day transactions to a Central Bank Profiling for better analysis to KYC for the MNO 120, the server hub 102 and/or the bank 130. The mobile number of the mobile device service operator 120 will be used as the account number in the profiling system.

The following are the mobile device remittance computer system 100 features:

1. The mobile device service operators 120 follow rules for generating a unique security code 300, and MPF file format.
2. The money managers (e.g., banks) 130 will deploy a bank module in the bank's computer system to interface with the mobile device remittance service provider 102.
3. The mobile device service operators send the remittance transaction using the local and redemption currencies. The local currency will be defined as part of the mobile device service operator 120 information record.
4. Banks 130 receive from the mobile device remittance service provider 102 the remittance transaction in the redemption currency which will be defined as part of banks information record.
5. Exchange rates loaded every day automatically to the mobile device service operators 120. In case of problem, a finance team might interfere to upload them manually.
6. Settlement between the banks and mobile device remittance service provider 102 should be outside the mobile payments (mobile remittance). Also, the settlement between mobile device service operators and mobile device remittance service provider 102 will be outside of the mobile payments.
7. Exchange rates used for each transaction will not be shared with banks.
8. If exchange rates have not been update by the mobile device remittance servicer provider 102, the mobile device service operator can use the existing exchange rates list.
9. The remittance amounts and currency exchange rates may or may not be validated.

Figure 5:
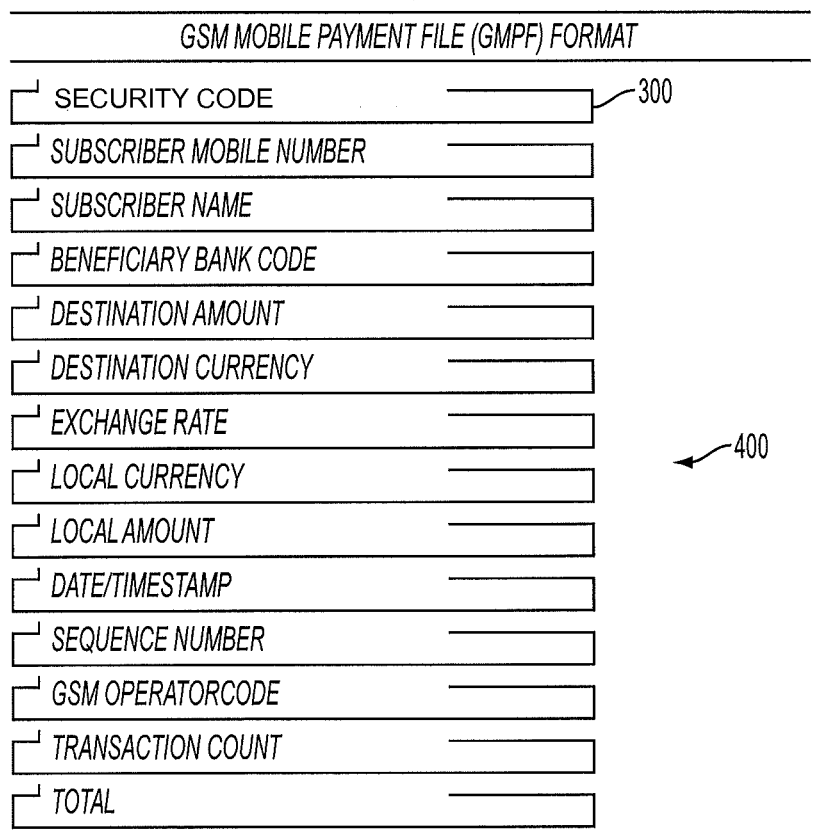
FIG. 5 is a diagram of a data structure of a mobile device service operator mobile payment file, according to an embodiment of the invention.

FIG. 5 is a diagram of a data structure of a mobile device service operator mobile payment file, according to an embodiment of the invention. The data structure 400 can be implemented in Extensible Markup Language (XML). The mobile device service operator (e.g., GSM) mobile payment file (GMPF) is a standard well-defined data format between the mobile device service operator 120 and the mobile device remittance service provider 102 that will be the main media to communicate remittance transactions between the computers systems of the mobile device service operator 120 and the mobile device remittance service provider 102.

The mobile payments transactions on the participating GSM side are submitted to the mobile device remittance service provider 102 in this file. This GMPF file abides by the format as predefined by the mobile device remittance service provider 102, concerning the remittance transactions' details included and the way the remittance transactions are distributed through the file header and content.

According to an aspect of an embodiment, the MPF of a mobile device service operator 120 includes one or more data of a security code 300, a subscriber or sender mobile device number, the subscriber name, beneficiary bank code, destination amount, destination currency, exchange rate, local currency, local amount, date/timestamp, sequence number, mobile device service operator code and a transaction count. According to an aspect of an embodiment, the subscriber or sender mobile device number, is unique information (e.g., a mobile phone number) that is associatable with both a subscriber (user) 122 and a mobile device 124 of the subscriber on the mobile device service operator 120 and identifies a subscription with an MNO 120.

A beneficiary mobile number is a number uniquely identifying a subscription of a remittance beneficiary 126 with an MNO (GSM or UMTS mobile network) of the beneficiary 126, for example, it is the telephone number to the SIM card in a mobile/cellular phone 128 of the beneficiary 126. According to an aspect of an embodiment, the MNO of the beneficiary 126 is an MNO in a second country in relation to the MNO 120 of the sending subscriber 122 in a first country. The beneficiary mobile number forms part of the remittance transaction fields and it is a mandatory requirement in which the sender subscriber 122 has to fulfill. The supplied beneficiary mobile number supplied forms part of the validations carried out upon disbursement of cash to the beneficiary 126 by a money manager 130 (e.g., a bank).

A country refers to a geographical area with pre defined and well known physical boundaries including adherence to a form of local and/or international financial laws and/or regulations.

The destination currency is a currency used by a destination money manager (e.g., a bank) to pay for beneficiary. The local currency is a local country currency used by a mobile device service operator 120 providing mobile device service in the country in which the remitting user 122 and/or mobile device 124 is located.

Figure 6:
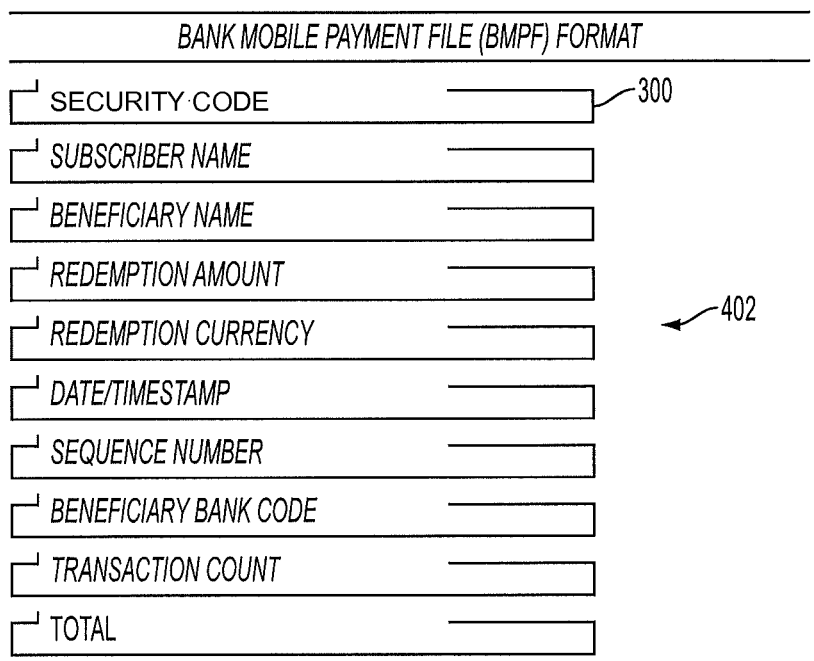
FIG. 6 is a diagram of a data structure of a money manager mobile payment file, according to an embodiment of the invention.

FIG. 6 is a diagram of a data structure of a money manager mobile payment file, according to an embodiment of the invention. The data structure 402 can be implemented in XML. The money manager (e.g., bank) mobile payment file (BMPF) is a standard well-defined data format between the mobile device remittance service provider 102 and money manager 130 that will be the main media to communicate remittance transactions between the computer systems of the mobile device remittance service provider 102 and the banks participating in the mobile payment process.

The mobile payment transactions on mobile device remittance service provider side are submitted to banks in this file format. This BMPF file abides by the format predefined by the mobile device remittance service provider 102 concerning the remittance transactions' details included and the way they are distributed through the file header and content.

According to an aspect of an embodiment, the MPF of the money manager 130 includes one or more data of security code 300, subscriber name, beneficiary name, redemption amount, redemption currency, date/timestamp, sequence number, beneficiary bank code and transaction count.

Figure 7:
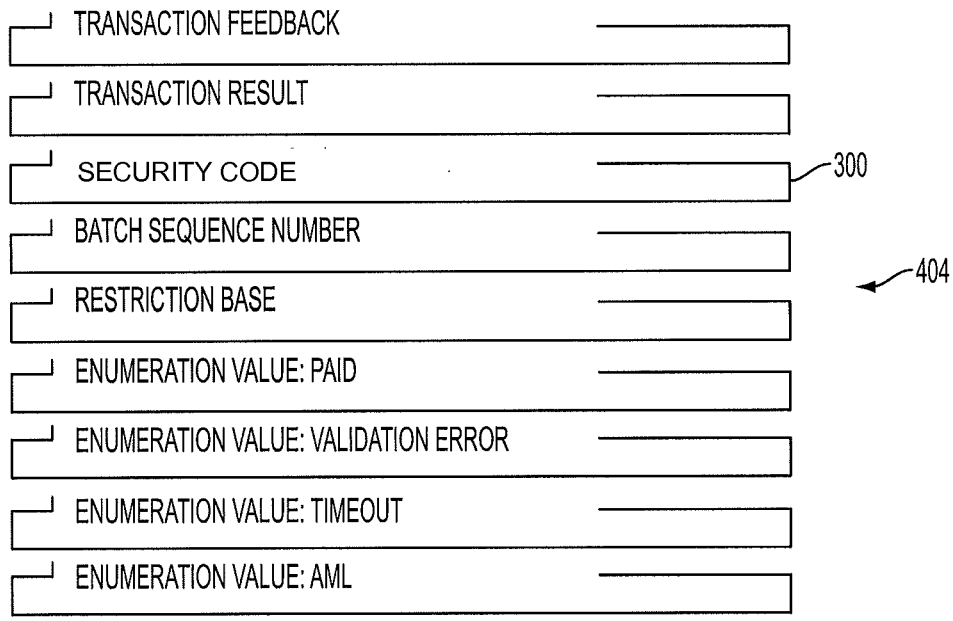
FIG. 7 is a diagram of a data structure of a status mobile payment file, according to an embodiment of the invention.

FIG. 7 is a diagram of a data structure of a status mobile payment file, according to an embodiment of the invention. The data structure 404 can be implemented in XML. The status mobile payment file (SMPF) is a standard well-defined data format for storing the remittance transactions' statuses as reflected on by the participating entities. According to an aspect of an embodiment, the SMPF includes one or more data of transaction feedback, transaction result, security code 300, batch sequence number, restriction base, one or more enumeration values of Paid, Waiting For Payment, Validation Error, Timeout, and Anti Money Laundering (AML). AML refers to the process of changing large amounts of money obtained from crimes, such as drug trafficking, into origination from a legitimate source.

According to an aspect of an embodiment of the invention, the mobile device remittance computer system 100 implements revenue sharing among the involved entities, for example, among entities 120, 102 and 130. According to an aspect of an embodiment, revenue sharing can be managed (e.g., viewed, changed, updated, etc.) on an MNO 120 basis and/or country basis through the server hub 102 as illustrated in FIG. 17, share % field 170.

According to an aspect of an embodiment, the mobile device remittance computer system 100 provide a monitoring tool at the mobile device remittance service provider 102 and at the money manager 130 to follow up with the statuses of all mobile payment transactions with the facility (e.g., computer implemented user interface) to change statuses and reflect on this change.

According to an aspect of an embodiment, the mobile device remittance computer system 100, for example, the mobile device remittance service provider 102, generates reports for the remittance transaction based upon the database logs maintained at the computer systems 120, 102 and/or 130, for example, at the end of each working activity day, to help those concerned with decision making to take right decision based on accurate reporting.

Figure 8:
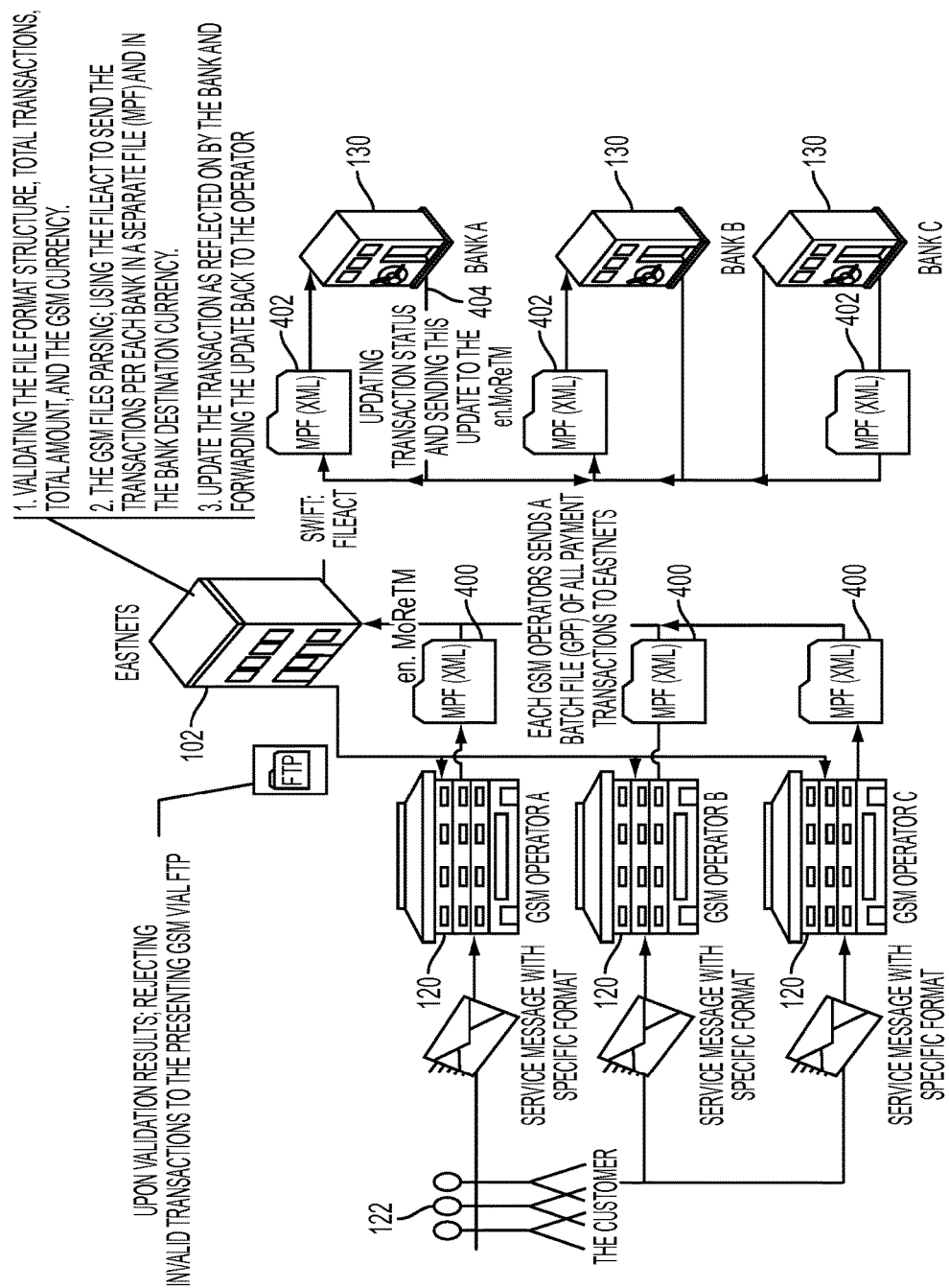
FIG. 8 is a data flow diagram for a remittance transaction, according to an embodiment of the invention.

FIG. 8 is a data flow diagram for remittances, according to an embodiment of the invention. In FIG. 8, a customer 122 using a mobile device causes a service message in a specific format (see FIG. 5) to be sent to the mobile device service operator (e.g., GSM operator) 120 requesting to remit certain amount of money. GSM operators 120 receive payment transactions from customers 122 and batch the transactions in a file abiding by a certain format (e.g., GMPF format 400) to consequently be sent to the mobile device remittance service provider 102 through a secured channel (e.g., SSL).

The mobile device remittance service provider 102 provides communication channels between the GSM operator 120 and the money managers (e.g., banks) 130. The mobile device remittance service provider 102 takes the role (implements the function) of a coordinating processor for the remittance (e.g., payment) transactions executed, and a checker for validating formats of the remittance transaction message of the mobile device service operator (e.g., GMPF 400) (file header details and content details), the transactions' amounts (whether total amount equals the file amounts, currency (whether the transaction currency equivalent to the bank destination currency). The mobile device remittance service provider 102 presents an exchange rate tool between the GSM operator's 120 local currency and the banks 130 destination currency. Besides imposing a monitoring tool to keep track of remittance transactions and their statuses, the mobile device remittance service provider 102 provides reporting mechanism; where responsible (target) users can generate detailed and summarized reports about the payment transactions in all entities in addition to the occurring activities and the action logs.

The bank interface is for transmission and reception of the remittance transaction message of the mobile device remittance service provider (e.g., BMPF 402) to/from/by the money manager (e.g., bank 130) through the FileAct swift to the participating banks 130, and for sending back by the bank 130 the transactions' status file (e.g., SMPF 404) to the mobile device remittance service provider 102 after applying the needed changes. The bank interface provides bank authorized employees with the capability to query, monitor, update, approve, and cancel transactions plus generating the reports needed by the bank such as delivered transactions, pending transactions besides others.

According to an aspect of an embodiment of the invention, the customer 122 mobile number is used as an account number in the profiling system for AML/CFT along with other parameters and the remitter 122 does not need to have an account number with a bank to benefit from the mobile payment process. According to an aspect of an embodiment, the remitter 122 would register with the MNO 120 for a remittance service to meet the KYC regulations, where the remitter 122 submits evidence artifacts to prove the personal identify and supply cash to any of the MNO 120 service centers or certified partners for remittance purposes. According to an aspect of an embodiment, an end-user 122, 126 subscription with an MNO 120 meets the KYC regulations, and thereby assignment of a mobile device number to a mobile device 124, 128 of the end-user 122, 126 by the MNO 120 implicitly meets KYC regulations for both the remittance sender 122 and the remittance beneficiary 126. According to an aspect of an embodiment, an MNO 120 can be an MNO 120a-n in one or more countries for the remittance sender 122 and/or the remittance beneficiary 126. In other words, by imposing KYC obligations on the MNO 120 according to financial regulations (country and/or international), the mobile device number is useable as an implicit KYC authentication factor. According to another aspect of an embodiment, the beneficiary of the remittance does not need a bank account, but would claim the remittance at a bank 130 by a security code generated by the server hub 102 (discussed in more detail herein). Other form of authentication mechanism for the beneficiary could be required according to the bank 130 country financial regulations and/or the MNO country financial regulations. According to an aspect of an embodiment the bank 130 activates KYC, including the beneficiaries mobile device number in the second country, providing implicit KYC authentication factor for the beneficiary of a remittance transaction to the bank 130. According to an aspect of an embodiment, the KYC that is activated by the MNO 120 and/or bank 130 is based upon one or more of a country passport or other identification recognized internationally or among the first and second countries involved in the remittance transaction as proof of citizenship, residency, and/or person, of the sending subscriber 122 and/or the beneficiary 126.

The mobile device service operator 120 submits GMPF 400 to the mobile device remittance service provider 102 using the GSM 120 local currency; however, banks 130 receive BMPF 402 from the mobile device remittance service provider 102 in the bank 130 destination currency.

The mobile device remittance service provider 102 can provide GSM operators 120 with the exchange rate service on a daily basis through a web service and/or provide the exchange rate service at the mobile device remittance service provider 102.

According to an aspect of an embodiment, the GSM operators 120 in same country use same exchange rates and no special rates for each GSM in same country. However, the embodiments are not limited to this configuration, and a plurality of exchange rates can be provided.

Figure 9:
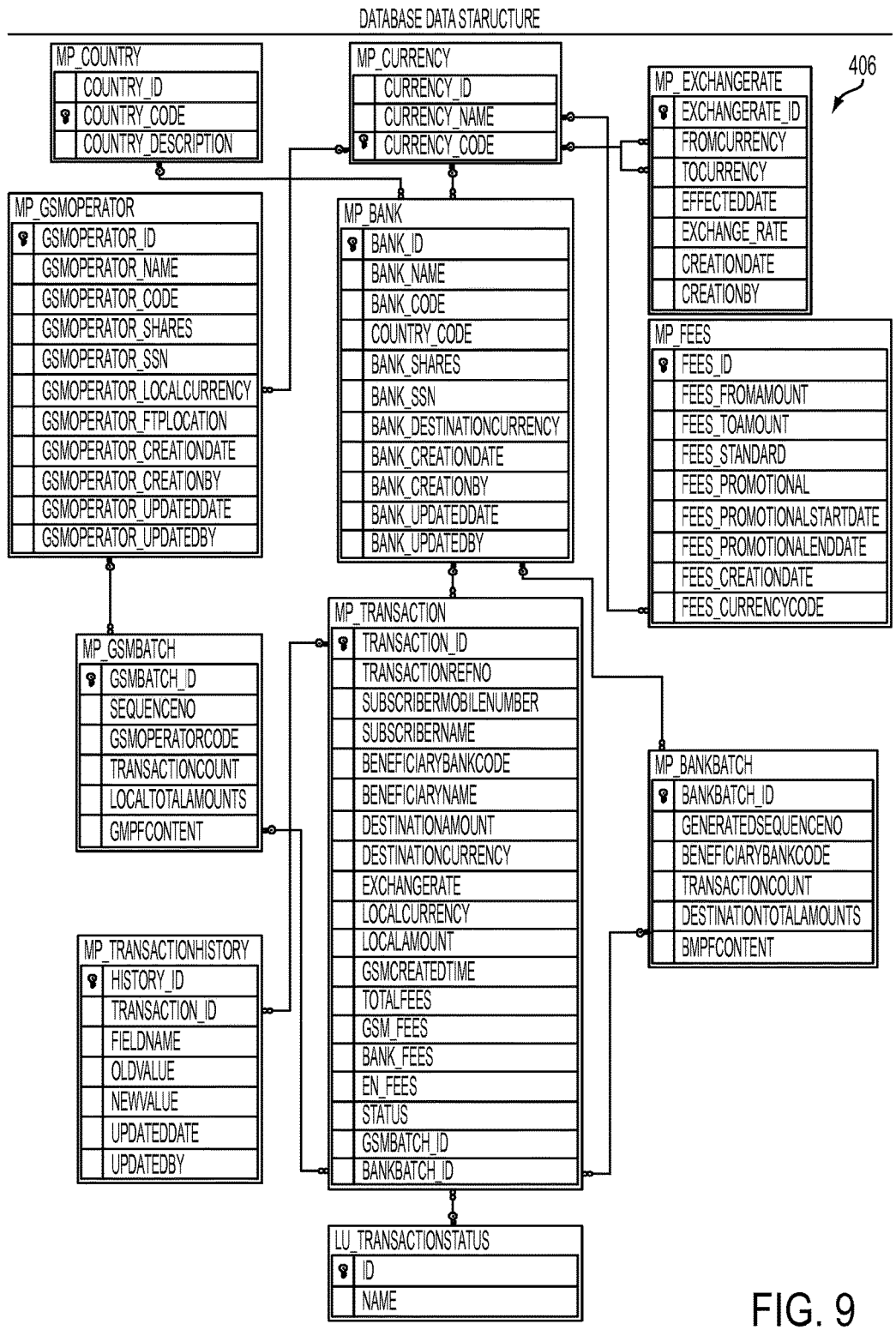
FIG. 9 is a diagram of a data structure in a computer of a mobile device remittance service provider, according to an embodiment of the invention.

FIG. 9 is a diagram of a data structure in a computer of a mobile device remittance service provider, according to an embodiment of the invention. In FIG. 9, a database 406 is a representation of data that achieves or relieves the financial legal and/or computer interface burden for/on the MNO 120, as described herein, for example, by FIGS. 1A-1C.

Figure 10A:
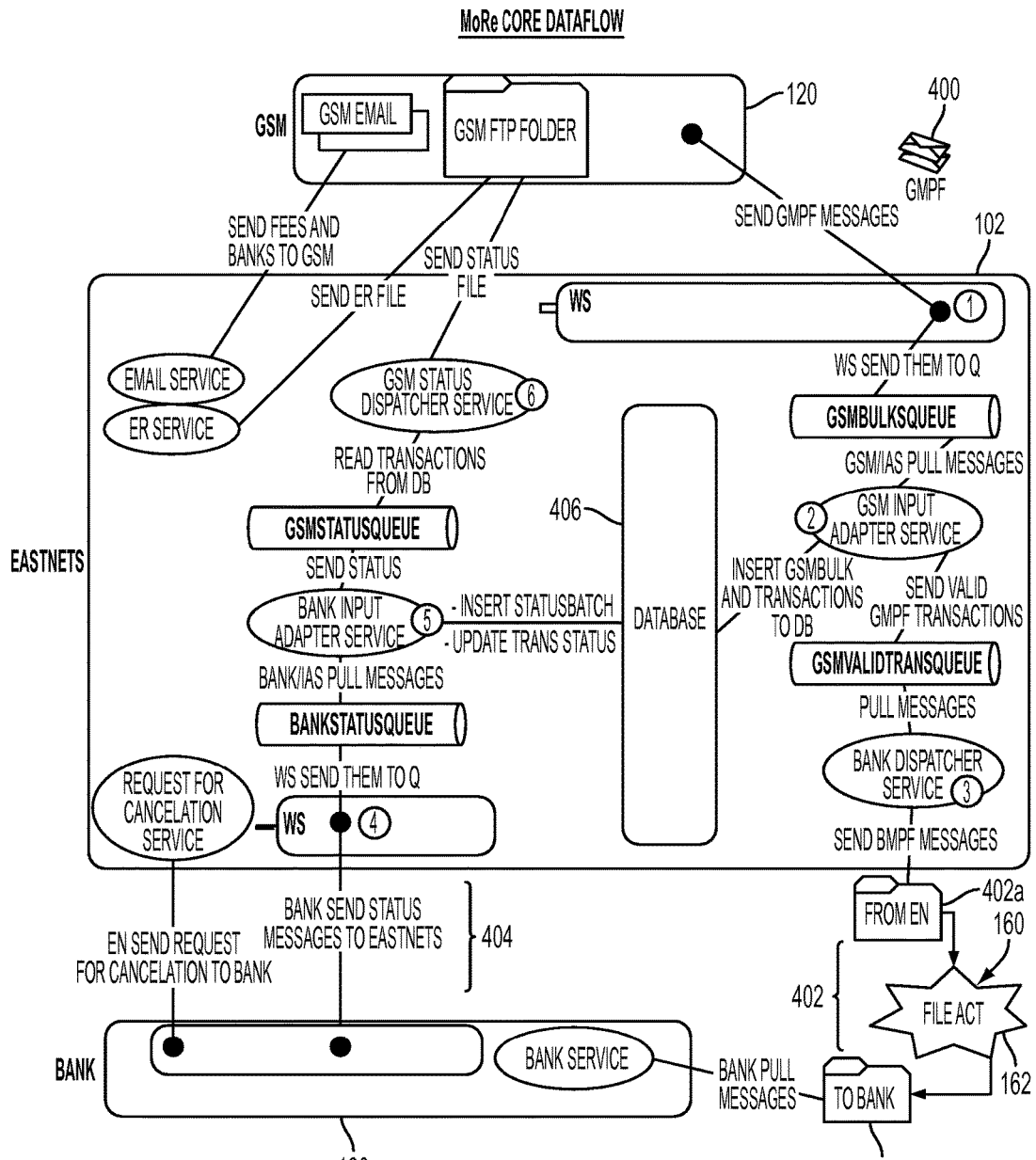
FIG. 10A is a data flow diagram for transformation of data in a mobile device remittance, according to an embodiment of the invention.
Figure 10B:
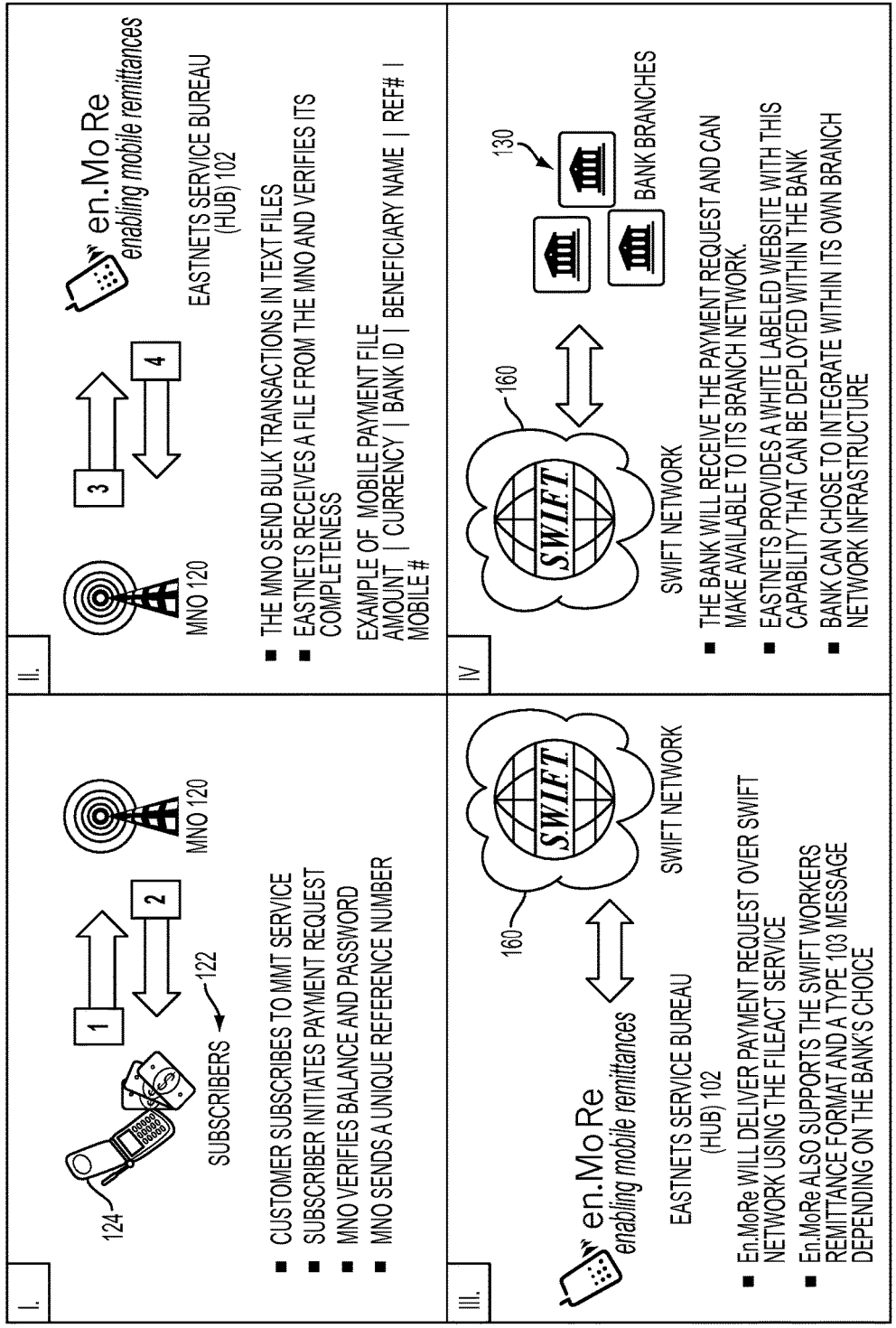
FIG. 10B is a diagram of roles and responsibilities for each party within the mobile remittance computer system, according to an embodiment of the invention.
Figure 10C:
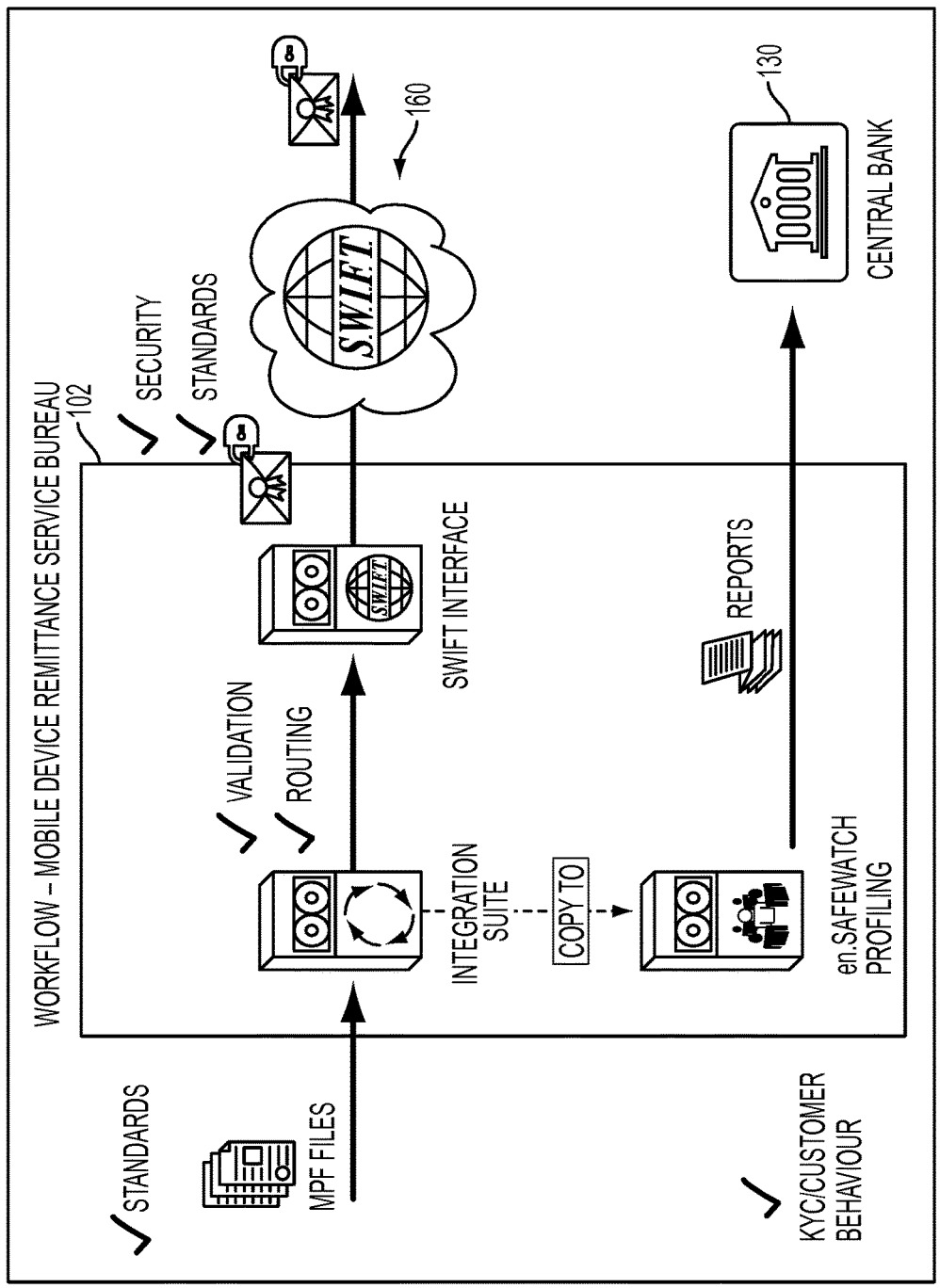
FIG. 10C is a workflow diagram for a mobile device remittance, according to an embodiment of the invention.
Figure 10D:
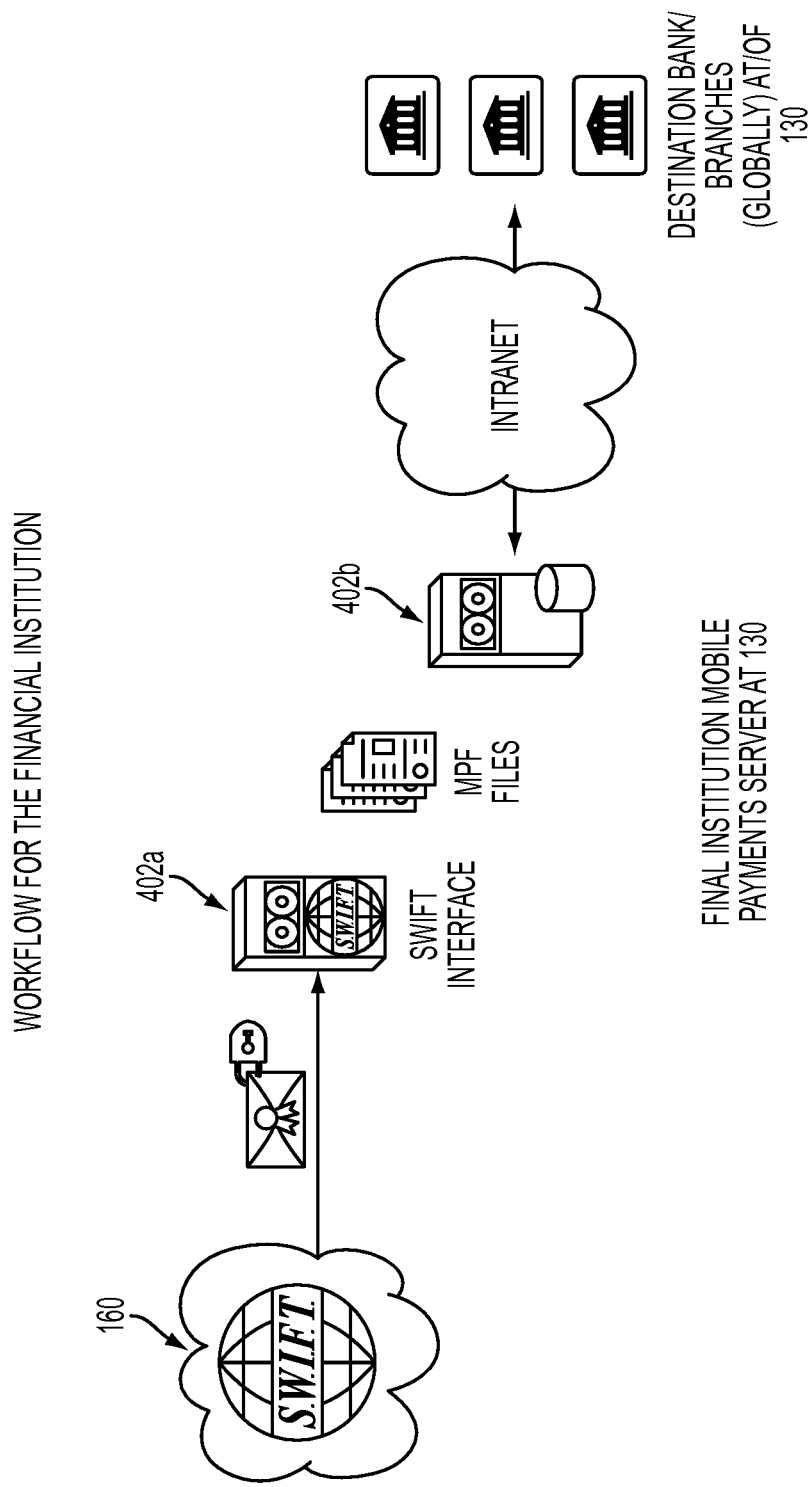
FIG. 10D is a diagram of continuation of the workflow in FIG. 10C at a financial institution, according to an embodiment of the invention.

FIG. 10A and FIGS. 11-16 are data flow diagrams and flow charts of a mobile device remittance according to an embodiment of the invention. FIG. 10A and FIGS. 11-16 cover the overall mobile payment process through the mobile device remittance service provider 102 to present a general view to the solution behavior, where FIG. 10A is the overall data flow diagram for transformation of data inside the core application, namely the server hub 102, in a mobile device remittance, and FIGS. 11-16 are sub-flowcharts of FIG. 10A.

At operation (1), by a Web service (WS), the mobile payment process is initiated when the mobile device service operator 120 sends GMPF 400 message by pushing the GMPF 400 messages on to a GSMBulkQueue. And the mobile device remittance service provider 102 receives GMPF 400 messages from the GSM operator 120 by pulling the GMPF 400 messages from the GSMBulk Queue by way of the web service.

At operation (2), by a GSM input adapter service, a series of transaction content validations are made on the received GMPF 400 messages and GMPF 400 valid transactions are moved to the "GSMBulksValidTransQueue." At operation (3), a bank dispatcher service pulls messages from the GSMValidTransQueue and sends BMPF 402 messages to a bank 130 by way of FileAct 162 or FTP/SFTP (the applied message pull method can be determined through a configuration parameter). The bank 130 pulls the BMPF 402 messages from the FileAct 162 and makes a remittance for a beneficiary of the redemption currency specified in the BMPF 402 message.

At operation (4), the bank 130 sends SMPF 404 messages mobile device service operator 120 by FTP/SFTP location, then BankRecieveFile service reads SMPF files and inserts them to BankStatusQueue. At operation (5), the bank input adapter service pulls the SMPF 404 messages from BankStatusQueue, and sends the SMPF 404 messages to the GSMStatusQueue. At operation (6), the GSM Status Dispatcher service sends status file(s) to the GSM operator 120.

Therefore, according to an embodiment of the invention, a web service and one or more web services based remittance transaction queues are provided for pushing and pulling remittance transaction massages by the computers of the mobile device service operator 120, the mobile device remittance service provider 102 and the money manager 130. According to an aspect of an embodiment, the server hub 102 queues receive remittance transaction files from one or more MNOs 120, aggregate the remittance transactions from different MNOs 120 (on MNO basis) in first countries and for different banks 130 in different target (second) countries of beneficiaries (country and bank of beneficiary basis), thereby the server hub 102 automatically collects, sorts and aggregates data to be sent out.

According to an aspect of an embodiment of the invention, a method of remittance across countries is provided by which a mobile device remittance service provider computer system (server) 102 is a hub to one or more mobile device service operator computer systems (Mobile Network Operators (MNO)) 120 in a first country and one or more money managers (e.g., financial institution, banks—hereinafter referred to as banks) 130 in a second country, thereby providing a many-to-many hub model business and computer interface relationships among MNOs 120 in a first country and banks 130 in a second country. The server hub 102 centrally provides Know Your Customer (KYC), Anti Money Laundering (AML), and (Combating Financing of Terrorism (CFT) features to centrally complement or enhance MNO's 120 own compliance obligations, among others, and/or Know Your Customer (KYC) as dictated by banks 130 own central banks.

According to an aspect of an embodiment of the invention, a mobile device remittance service computer server hub 102 provides one or more first web services to the MNOs 120 in the first country for uploading on an MNO 120 basis batches (bundles or aggregation) of remittance transactions, input by subscribers 122 of the MNOs 120 via respective mobile devices 124, for processing by the server hub 102. The server hub 102 centrally desegregates (filters) the batches of the remittance transactions on a second country bank 130 basis, and according to pre-established legal (e.g., contractual), licensed, and/or computer interface compliant, business relationships and/or data communication channels provides the received remittance transaction to the banks 130 in the second country for remittance to target beneficiaries. According to an aspect of an embodiment, the server hub 102 converts the remittance transaction information received from the MNOs 120 in the first country into compliant remittance information for the banks 130 in the second country. According to an aspect of an embodiment, a computer interface to a bank 130 in the second country is further interfaced with a second web-service for batch pulling or on a remittance basis, the converted remittance information by the banks 130 in the second country, including one or more branches of a bank 130 in the second country. According to an aspect of an embodiment the second web-service for pulling of remittance transaction by the banks 130 in the second country can be provided by the server hub 102 and/or at computer system of the banks 130 in the second country.

According to an aspect of an embodiment, one or more third web services 402b on a bank 130 basis are provided by the server hub 102 for remittance status reporting by the banks 130 in the second country to the server hub 102. According to an aspect of an embodiment, one or more fourth web service on MNO 120 basis are provided for remittance status reporting by the server hub 102 to the MNOs 120 in the first country.

According to an aspect of an embodiment, a web service is provided by the server hub 102 to the MNOs 120 and the banks 130, where the web service provides one or more queues for pushing and pulling of one or more (e.g., bundles of) remittance transactions submitted among the MNOs 120 and the banks 130. The remittance transactions within the queues are centrally traceable on MNO 120, bank 130, remittance part(ies) and remittance amount basis for profiling according to governing financial regulations for a remittance in the countries involved in a remittance transaction, based upon filtration of the mobile device 124 number of the sender 122 of a remittance and/or the security code 300. The central traceability of the remittance transaction via the remittance transaction queues can be a financial regulatory compliance criteria.

According to an aspect of an embodiment, the server hub 102 can be one or more computer in data network communication and can be physically locate anywhere, in the first country, the second country, or any combinations thereof, so long as the server hub 102 provides for an MNO 120 in a first country pre-established legal (e.g., contractual), licensed, and/or computer interface compliant, business relationships and/or data communication channels, to a bank 130 in the second country.

Figure 10E:
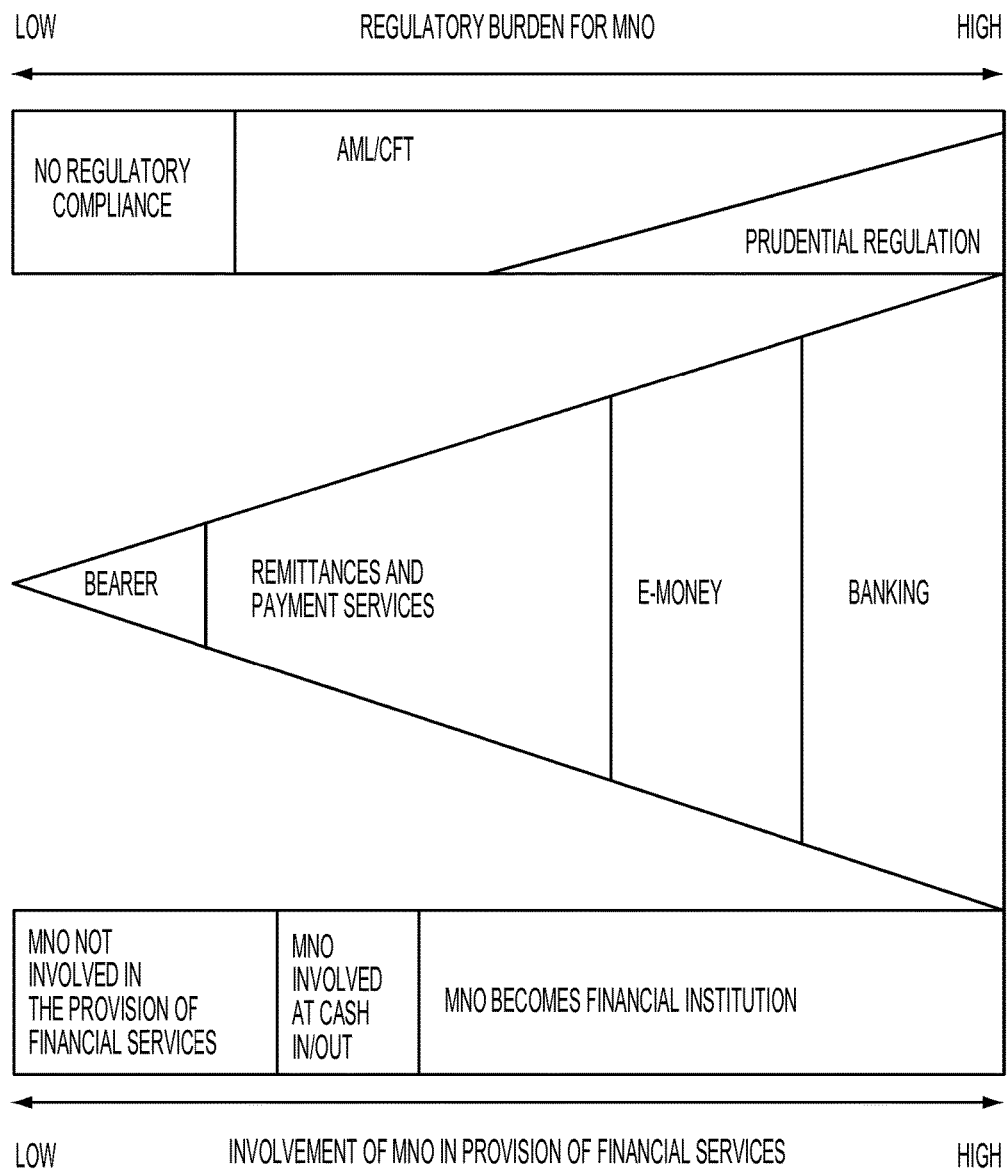
FIG. 10E is a diagram of financial regulatory imposition (application) and burden on a corporate entity.

FIG. 10E is a diagram of financial regulatory imposition (application) and burden on an corporate entity. More particular, according to an embodiment of the invention, a method and computer system is provided to relieve the financial regulatory burden on a mobile device service operator or MNO in a first country that provides a mobile device remittance service between a subscriber of the MNO and a beneficiary in a second country using a bank in the second country. According to an aspect of an embodiment of the invention, the server hub 102 is configured to executed one or more of the following processes, according to desired level of financial regulatory imposition or governance on an MNO of a country (country by country and/or MNO by MNO basis) that offers a remittance service to a subscriber, of:

(1) Anti-Money Laundering (AML) and/or Combating/Countering of Financing of Terrorism (CFT) processing of a remittance transaction input or initiated by a sending subscriber 122 of an MNO 120 in a first country to a target bank and beneficiary in a second country, where the input remittance transaction has been subjected by the MNO 120 to only a Know Your Customer (KYC) process or equivalent process for meeting AML/CFT (i.e., KYC is activated by MNO 120) and accepting cash from the subscriber without falling under provisioning of a financial service provider; (2) specify and impose or enforce a remittance amount or money value threshold, for example, on a remittance transaction basis, on value within time period basis, or any combinations thereof. According to an aspect of an embodiment, the value of the remittance qualifies as a micro remittance, such as $200.00 or less per day, within a time period, and/or on end-user 122, 126 basis (amount determined according to sender and/or beneficiary of a remittance), etc. The remittance amount threshold can be specified and/or enforced by the server hub 102 on behalf of or for benefit of the MNO 120 and/or the bank 130 according to agreed commercial agreements; (3) generation of a security code 300 for the remittance sending subscriber 120 and the receiving bank and beneficiary of the remittance. The security code 300 (see FIGS. 5-7 and 9) is unique and the main key to be used when tracking the details of the remittance transaction through the MNO 120, the server hub 102 and the bank 130. An example of the security code 300 is a 16 digit alphanumeric string formed of the following fields of MNO operator code, a transaction random number, bank 130 abbreviation, sending country code, receiving country code). For example, ATT98765BBMEUSAE represents AT&T as an MNO 120, transaction random number 98765, BBME is a short abbreviation of a target bank 130 for remittance to a beneficiary, namely for HSBC bank's Bank Identifier Code (BIC), where the full BIC code for HSBC in UAE country (HSBSC UAE) is BBME AEAD, US is sending country US and AE is receiving country UAE. The information of the security code 300 complies with the applicable financial regulations and computer interface in the first and second countries of the sender and beneficiary (receiver) of the remittance and can be in forms other than a string. The security code 300 augments the MNO's 120 and/or bank 130 KYC compliance under the applicable financial regulations. According to an aspect of an embodiment, the security code 300 is filtered or parsed by the system 100 into and/or represented in the data fields of the data structures 400, 402 and 404 (e.g., MNO code, beneficiary bank code, etc.), and/or can be included as a remittance transaction serial number or in combination with a remittance transaction serial number (e.g., a random number); (4) generation of reports tracing status of remittances from the MNO 120 in the first country, to the server hub 102, to the bank 130 in the second country and to the receiving subscriber, on MNO, subscriber (sending and/or receiving) and bank basis for evidentiary compliance and tracking under the applicable financial regulations. According to an aspect of an embodiment, the combination of data in GMPF 400, BMPF 402 and SMPF, including one or more data of the KYC data collected at the MNO 120, the security code 300 generated by/for the server hub 102, sending subscriber mobile device number, beneficiary KYC data (e.g., security code 300 presented, beneficiary mobile device number), and the remittance transaction sequence number (e.g., for tracking, to prevent transaction replay) provide AML/CFT compliance for the MNO 120 to satisfy the MNO's financial regulatory burden. For example, the GMPF 400 template is used for validation that meets FATF for mobile financial services. The BMPF 402 is converted to be SWIFT 160 FileAct 162 enabled and adapted as a second step according to various types of remittance formats of SWIFT, for example, a worker remittance format from SWIFT (i.e., transformation of remittance transaction information input and generated at a mobile device 124 into a financial intuition compliant remittance format on remittance type basis). For example, there has been no connectivity between an MNO 120 and a bank 130 via SWIFT except for financial transaction related to the MNO 120 per se. The server hub 102 supports input of a short code message by a mobile device subscriber of the MNO 120 for a remittance transaction, templated (e.g., GMPF 400) according to server hub 102 requirements that meet the financial regulatory obligations of the MNO 120, and convert the templated short message code into a SWIFT message for a bank 130 to pay the remittance to a beneficiary of the remittance transaction. According to an aspect of an embodiment, the data structures 400, 402 and 404 support generation of one or more statistics of remittance transaction statistics, remittance transaction detail report (e.g., including all fields), beneficiary 126 profile statistics, sending subscriber 122, MNO 120 statistics, and/or financial institution 130 statistics, thereby supporting the MNO 120 to comply with good practice for AML/CFT as well as FATF for mobile financial services compliance, including MNO marketing campaign (e.g., marketing in compliance with AML/CFT). According to an aspect of an embodiment, financial regulatory obligation can be satisfied by the server hub 102 performing validation, routing, security (controlling information access or boundaries of confidentiality among the MNO 120, the server hub 102 and the banks 130), applying standards and reporting, based upon the data of data templates 400, 402 and 404 by any field (e.g., on basis sender, beneficiary, remittance amount, date/period, and/or remittance status, thereby providing server hub 102 based person-to-person remittance profiling over multiple MNOs 120a in a first country and multiple banks 130 and/or MNOs 120b in a second country) and for any or over any specific period of time and/or number of occurrences as associated with KYC based mobile device number issued to a remittance transaction party 122, 126 by an MNO 120a-n.

According to an aspect of an embodiment, the financial regulatory imposition threshold among 120, 102 and 130 can be changed according to applicable financial regulation centrally at the server hub 102 by downloading regulatory information and automatically applying the same to a remittance transaction by modifying the fields of the GMPF 400 and/or BMPF 402. In other words, the GMPF 400 and/or BMPF 402 are a standardized data structure representation for allocation of financial regulatory burden, security burden, confidentially, and privacy burden on the MNO 120 and the banks 130 in the context of a remittance across countries (e.g., maintaining currency exchange rate in confidence from the bank 130, the server hub 102 executes AML/CFT or profiling by way of the subscriber mobile number, maintaining confidentiality and privacy of the sending subscriber's money (sending bank) account at the MNO 120 side).

According to an aspect of an embodiment, the server hub 102 accommodates a universal monitoring and adjusting of financial regulatory burden on the MNOs 120 and/or the banks 130 by way of the standardized and customized data structures GMPF 400 and BMPF 402, where the data structures centrally accommodate new fields, updates and/or changes to meet the new demands of financial regulation. For example, GMPF 400 and BMPF 402 can request or specify on MNO and/or country basis data for the remittance and/or remittance AML/CFT profiling. According to an aspect of an embodiment, a graphical user interface permits changes to GMPF 400 and BMPF to take effect on MNO 120 on a country basis.

According to an aspect of an embodiment, the AML/CFT or financial regulatory compliance, is executed by profiling (tracing) the remittance transaction based upon an association of the mobile device number of the remittance sender and/or the security code 300 to the remittance transactions and to the applicable or governing financial regulation (e.g., AML/CFT), without bank account information. According to an aspect of an embodiment, the mobile device of a sender and/or the beneficiary is associatable with each remittance transaction for remittance transaction profiling to comply with financial regulations (e.g., AML/CFT, etc.) According to an aspect of an embodiment, in the event bank account information is provided by a sender of a remittance to the MNO 120, the bank account information can be derived from (traced back via) the mobile device number of a sender 122 of a remittance and/or the security code 300.

Figure 11:
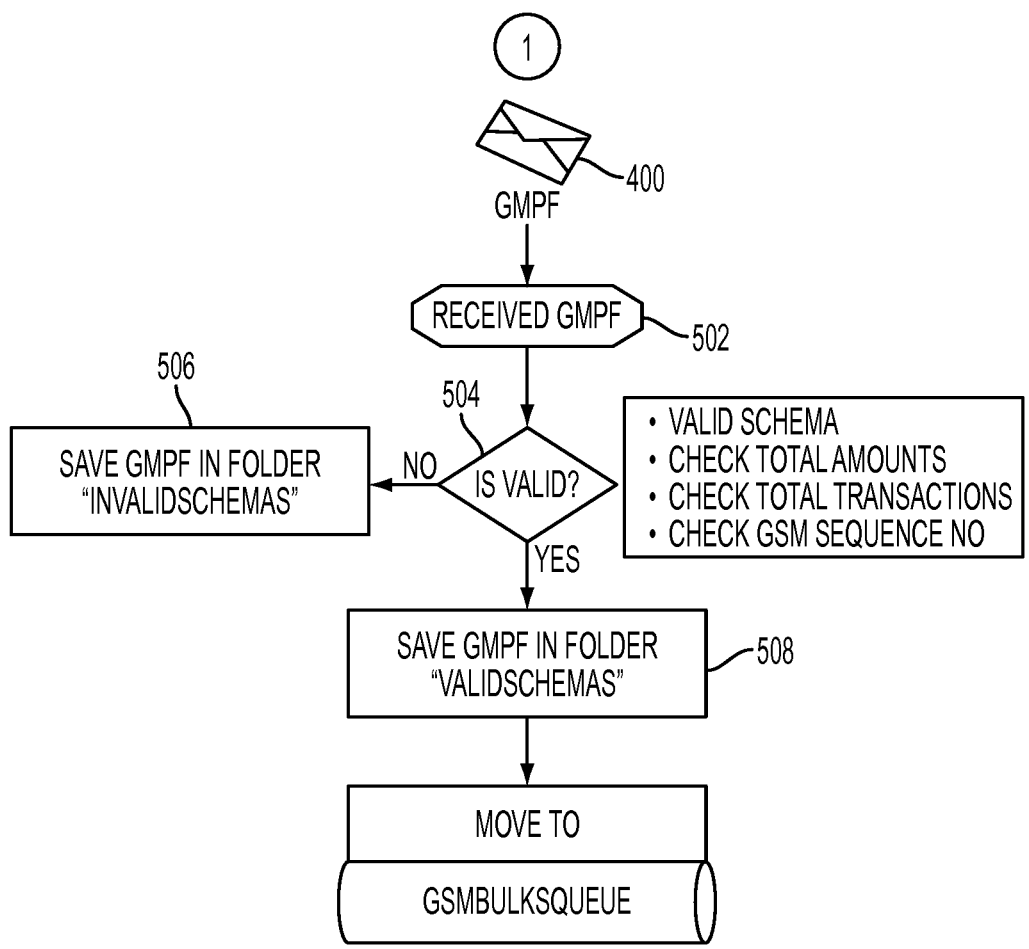
FIG. 11-16 are flow charts of a mobile device remittance according to an embodiment of the invention.

FIG. 11 is a more detailed flow chart of operation (1) in FIG. 10A. In FIG. 11, at 500 the mobile payment process initiates when the mobile device remittance service provider 102 receives GMPF 400 from the GSM operator 120. At 504, a series of validations are made on the received file 400 to check, for example, on its format structure (the details showing in the file header and content), the file total amount and the total transactions plus the GSM Sequence Number. In case the GMPF 400 is returned to be invalid, then at 506, the invalid GMPF 400 is saved in a folder called "Invalid Schemas." At 508, valid GMPF 400 are moved to a folder called "ValidSchemas" and then to the "GSMBulksQueue" through a web service. Yet, the GMPF is still not entered into the database.

Figure 12:
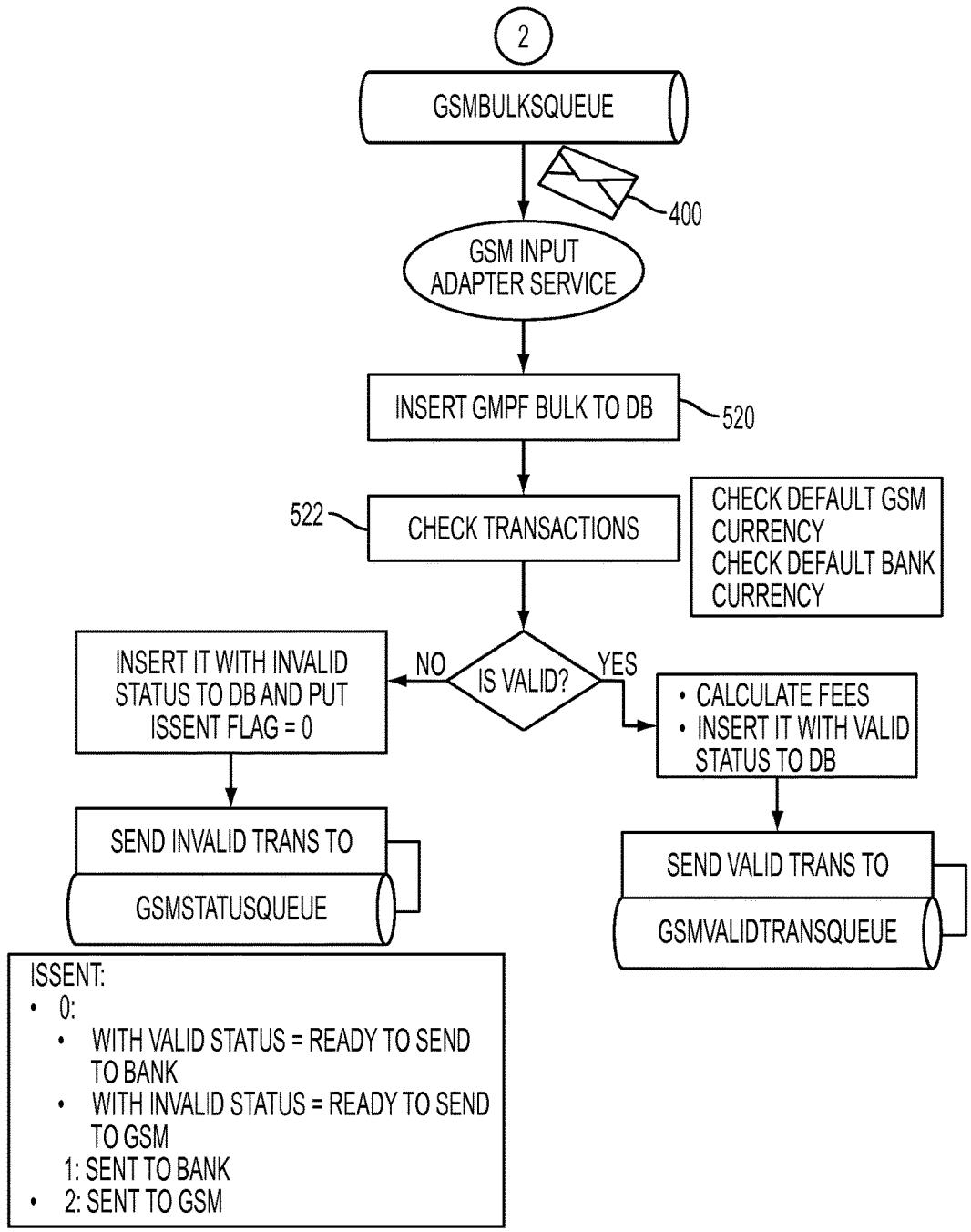

FIG. 12 is a more detailed flow chart of operation (2) in FIG. 10A. In FIG. 12, at 520, an Input Adaptor Service inserts the GMPF bulk into a database 406, where at 522, the content of the file transactions are checked, for example, concerning their default GSM 120 currency and the default target or destination bank 130 currency. At 522, for valid transactions, fees are calculated according to bank 130 configuration parameters (percentage of bank share) and the transactions themselves are sent to the "GSMValidTransQueue." At 522, invalid transactions are inserted into the database with an invalid status (returned flag=zero) and then forwarded to the "GSMStatusQueue."

Figure 13:
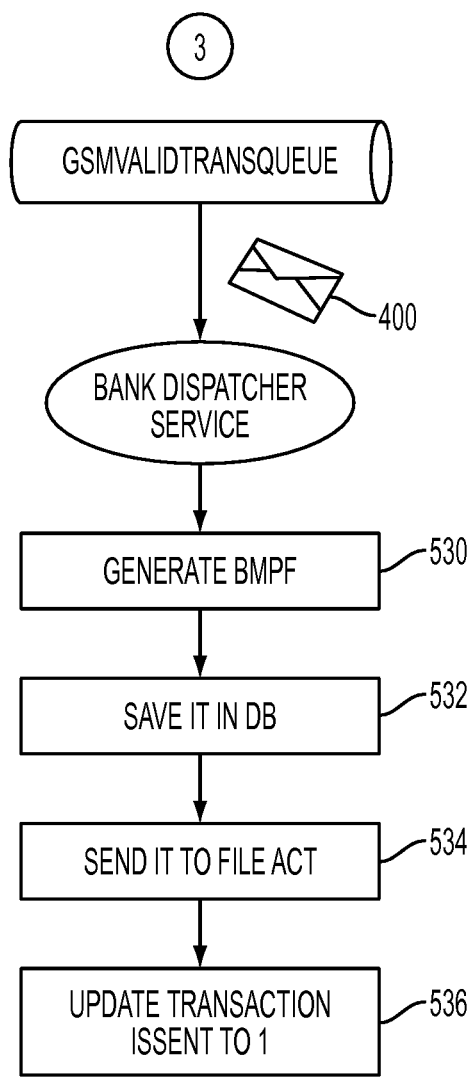

FIG. 13 is a more detailed flow chart of operation (3) in FIG. 10A. In FIG. 13, at 530, a Bank Dispatcher Service (WCF) restores the remittance transactions from the database 406 and after that generates a BMPF 402 to be saved at 532 in the database 406 and then at 534 sent to a FileAct (Swift) 162, where a file can be sent through FileAct or FTP/SFTP and the file transmission type can be determined through a configuration parameter. Before forwarding the BMPF 402 to the mobile device remittance service provider 102, at 536, the transaction status is updated according to the bank feedback, so that the mobile device remittance service provider 102 reflects on the transactions' status as provided by the bank 130.

Figure 14:
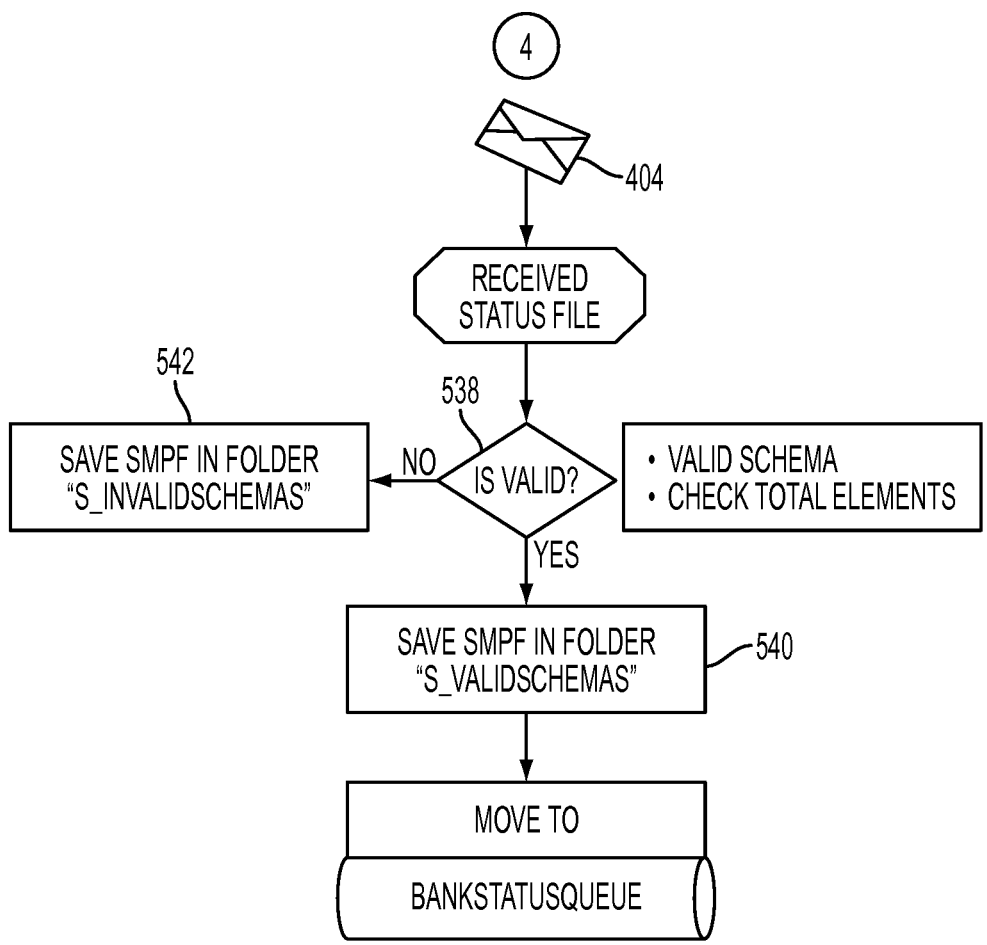

FIG. 14 is a more detailed flow chart of operation (4) in FIG. 10A. In FIG. 14, the bank 130 sends the SMPF 404 to the mobile device remittance service provider 102 (e.g., by FTP/SFTP), where, at 538, the SMPF 404 is validated in terms of its schema (correct format structure) and the total transactions inside; meaning, the total transactions inside the SMPF must equal its total. If the SMPF 404 is returned to be valid, then, at 540, the SMPF 404 will be saved in a folder called "S_ValidSchema" and after that sent out to "BankStatus Queue." Otherwise, at 542, the SMPF 404 will be dispatched to the "S_InvalidSchemas" folder.

Figure 15:
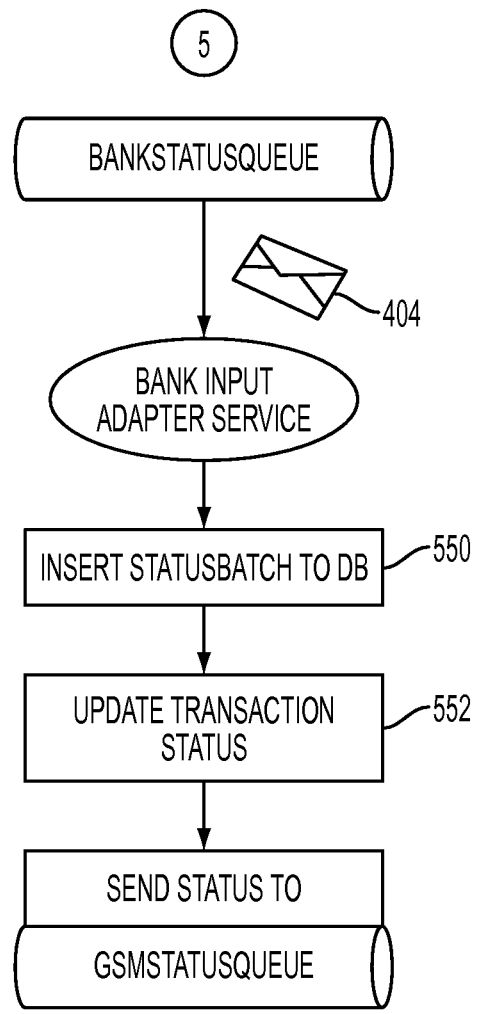

FIG. 15 is a more detailed flow chart of operation (5) in FIG. 10A. In FIG. 15, a Bank Input Adaptor Service (WCF) at 550 inserts the Status Batch 404s into the database 406 and at 552 updates the remittance transaction status accordingly, before dispatching the status batch to the "GSMStatus Queue."

Figure 16:
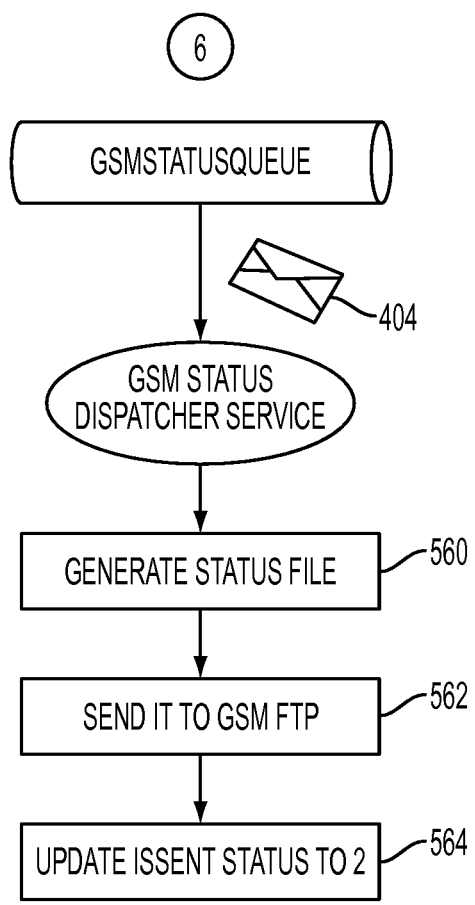

FIG. 16 is a more detailed flow chart of operation (6) in FIG. 10A. In FIG. 16, at 560, GSM Status Dispatcher Service (WCF) reads the SMPF 404 transactions from the database 406 and generates a status file which, at 562, is sent out to the GSM FTP folder so that the transactions status is updated in the GSM database of the mobile device service operator 120. At 564, the transaction IsSent status is updated to 2 (SentToGSM).

Three types of the remittance transactions' files are supported in the mobile payment process executed through the mobile device remittance computer system 100:

1. GMPF: GSM Mobile Payment File Format 400
2. BMPF: Bank Mobile Payment File Format 402
3. SMPF: Status Mobile Payment File Format 404

The mobile device remittance service provider 102 determines the supported files' format structure and the way transactions' details are distributed in the files' header and content.

FIGS. 17-22 are user interface computer display screens of the mobile device remittance computer system, according to an embodiment of the invention. Each computer display screen is described in terms of its business (mobile device remittance computer system) function, its user interface components and layout, plus any special processing or any expected error messages. The described output (e.g., display, report) filtering process and activity can be by any one or combinations of the fields as selected.

FIG. 17 is a display screen 600 that can be used by the mobile device remittance service provider 102 to manage participating mobile device service operators 120. Business Function: This page is used to view a list of the GSM operators available, edit their details, delete the operators no more involved in the mobile payment process and add new GSM operators.

Filtering: Enhanced with filtering criteria, concerned users can quickly search for the needed GSM operators and limit the results to their need by selecting the GSM Name from the picklist and/or enter GSM Code in the designated fields. In addition, local (MNO 120) currency and country can be used as a filter.

Clicking the Search button will view the results; clicking Clear will empty the entry fields from their data and reload all GSMs.

Results: The following details will appear for each GSM; The GSM Name, Code, Local Currency, FTP Location and username and password, Share % (the fees percentage calculated for the GSM per the mobile payment service) and the Last SSN (the last batch of remittance transactions sent by each GSM; each batch has a sequential serial number).

FIG. 18 is a display screen 610 that can be used by the mobile device remittance service provider 102 to manage currency exchange rates. Business Function: This page displays a list of the exchange rates (from the GSM currency to the bank currency) that the mobile device remittance service provider 102 provides to the GSM operator 120, for example, on a daily basis. Exchange rates are uploaded to GSM FTP Folder automatically by Exchange Rate Service.

Filtering: To filter the results and limit them, the user can select the Date from the Calendar and enter the range of currencies From/To.

Clicking the Search button will view the results; clicking Clear will empty the entry fields from their data and reload all data.

Results: The list of Exchange Rates includes the following details; From Currency, To Currency (Destination Currency), the Exchange Rate and Date (when each exchange rate is calculated and loaded).

Figure 19:
Figure 25B:
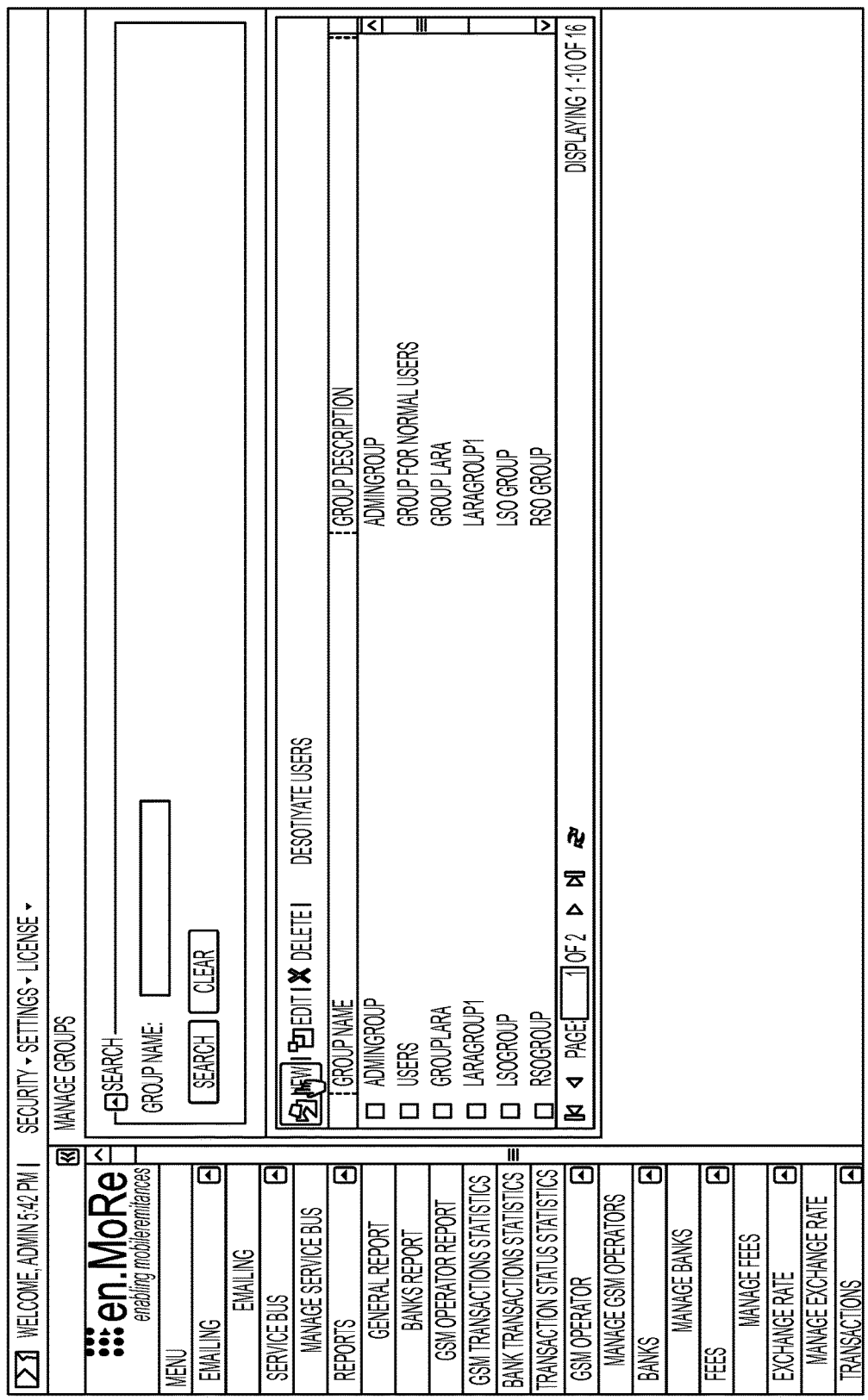
Figure 25C:
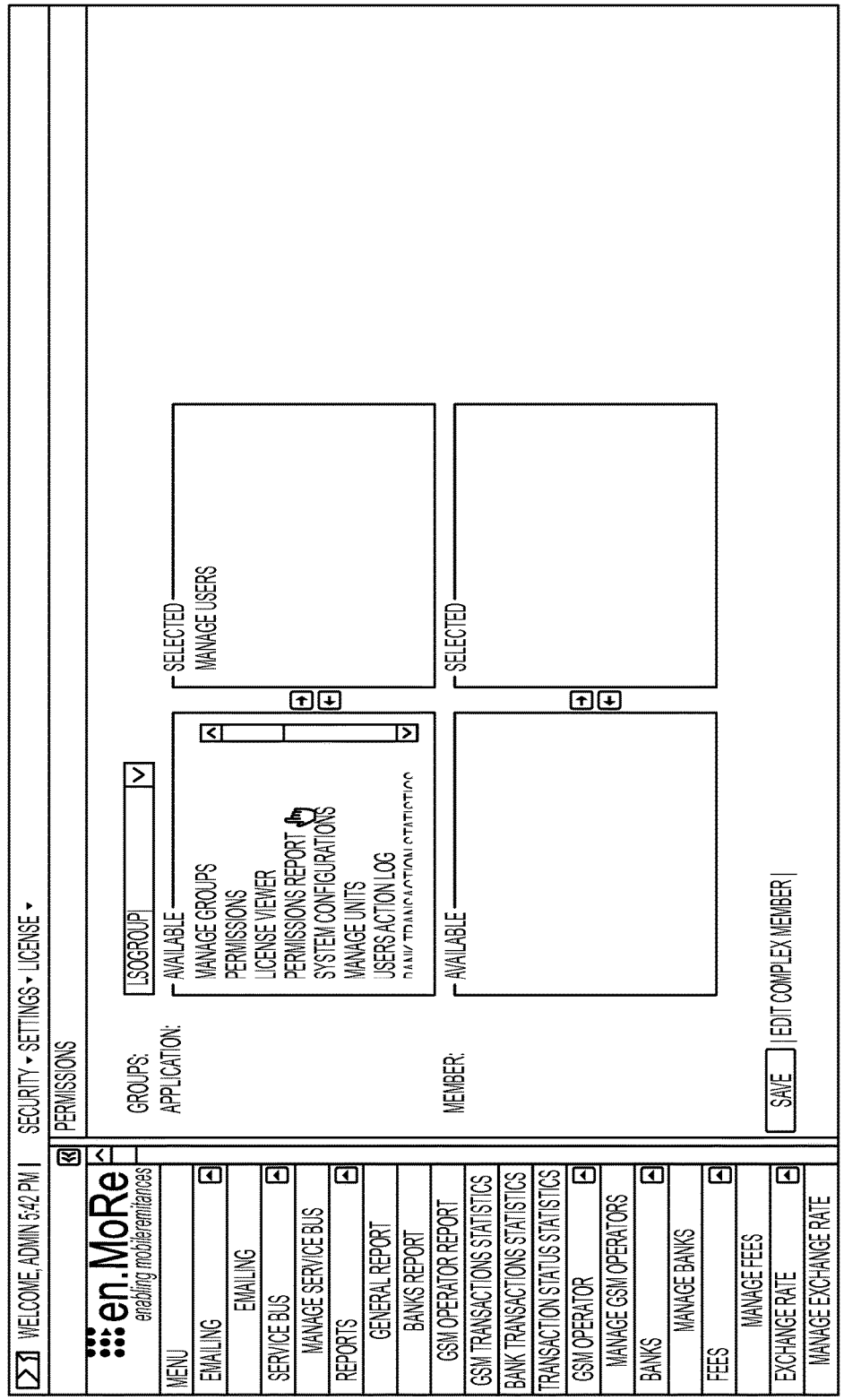
Figure 25D:

FIG. 19 is a display screen 620 that can be used by the mobile device remittance service provider 102 to manage service fees.

Business Function: This page displays a list of the fees that the mobile device remittance service provider 102 imposes on the mobile payment services for the benefit of one or more of the GSM operator 120, the mobile device remittance service provider 102 and the involved banks 130. There are two types of fees; standard fees (regular fees) and promotional fees (fees less than the standard ones and imposed on the mobile payment services during a specific period of time as an encouragement). The user can add a new fee to the fees list and edit details of the ones already available.

Filtering: To limit the results, the user can select the Fees type, the promotional fee Date and the Amount From/To.

Clicking the Search button will view the results; clicking Clear will empty the entry fields from their data and reload all data.

Results: The fees list will display the Amount from/To, Standard Fees, Promotional Fees and their Dates and currency.

FIG. 20 is a display screen 630 that can be used by the mobile device remittance service provider 102 to manage destination banks 130.

Business Function: This page is used to add the share fees per each bank; view a list of the ones already added and edit their details, plus deleting any of them for any appropriate reason. The bank share fee is the result of the bank share %*(multiply) standard fee. The entire fees share must be 100%; thus all of the GSM, EastNets and the Banks will share in the fees revenue each with a certain percentage. The revenue share model among the MNO 120, the server hub 102 and the financial institution 130 reduces the cost for the end-user remittance sending subscriber 122, for example, a migrant worker, tourist, etc. In addition, the server hub 102 provides a critical mass approach with MNOs 120 having access to many types of subscribers, for example, unbanked subscribers, and/or MNOs 120 keen to have a captive audience and customer loyalty, as incentive to the MNOs to agree to lower remittance commissions to the sender 122.

Filtering: To limit the results, the user can select the Bank Name, the Bank Code and the Share, bank country and bank currency.

Clicking the Search button will view the results; clicking Clear will empty the entry fields from their data and reload all banks.

Results: Once search is run, the following details will be listed; the Bank Name/Code plus the Bank Share.

Figure 21:
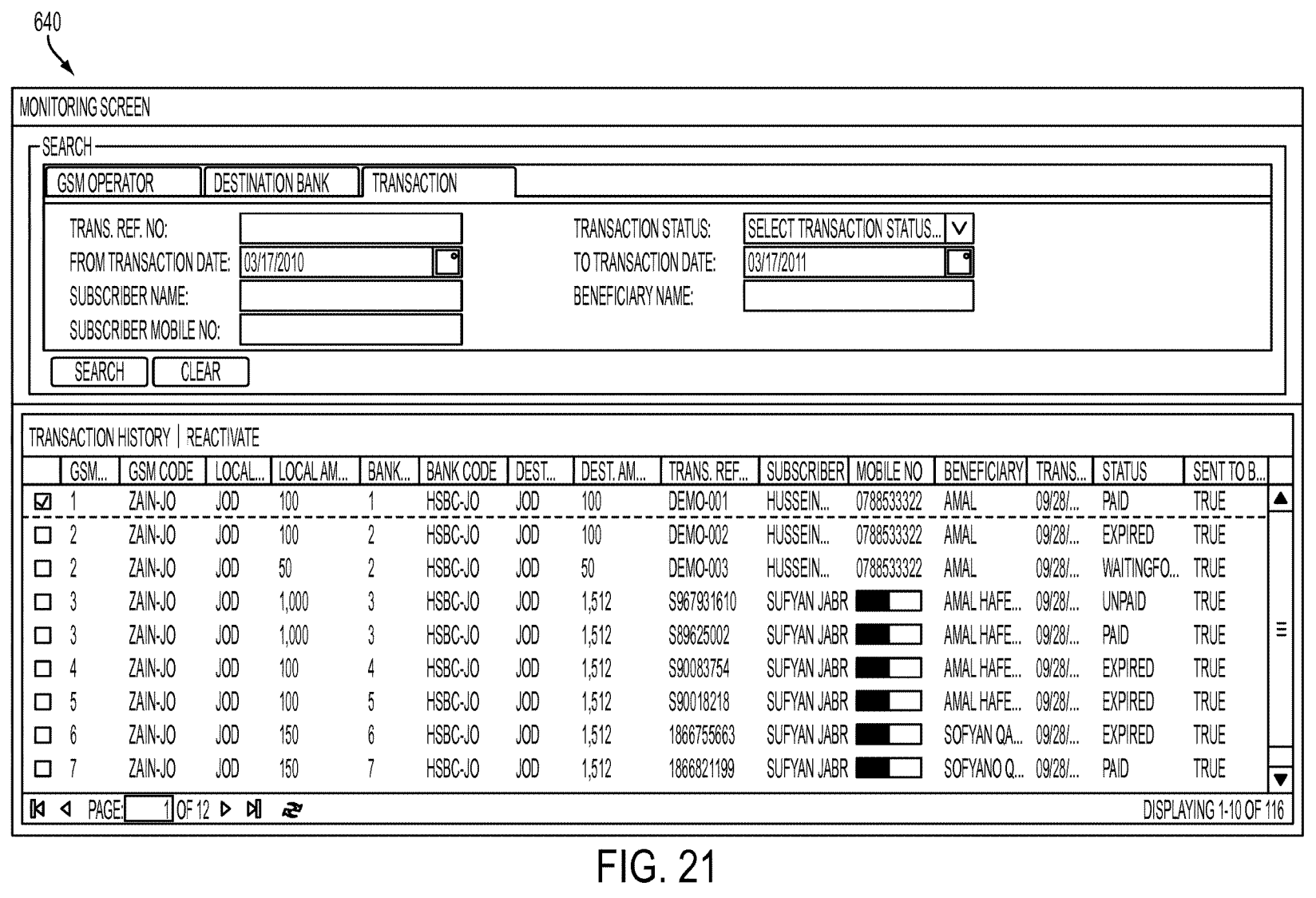

FIG. 21 is a display screen 640 that can be used by the mobile device remittance service provider 102 to monitor remittance transactions.

Business Function: Since the mobile device remittance service provider 102 serves as middle tier between GSM operators 120 and the corresponding banks 130, this screen exists in mobile device remittance service provider 102 to allow responsible users at mobile device remittance service provider 102 to keep track over the system's ins and outs. Which means, observing the transactions arriving at mobile device remittance service provider 102 from GSM 120 and banks 130 and those dispatched from mobile device remittance service provider 102 to them.

Filtering: Using the screen filtering criteria to limit the results just to the user's need. Some of the filtering criteria are selected from a picklist and calendar icons and some are entered into the designated fields.

Clicking the Search button will view the results; clicking Clear will empty the entry fields from their data and reload all transactions that inserted in the current date.

Core Monitor Screen displays the following information; GSM File SSN, Bank File SSN, Transaction Reference Number, Subscriber Name, Mobile Number, Beneficiary Name, Transaction Status, File Status, Local Currency, Destination Currency, Destination Bank, Amount From/To and Transaction Date From/To.

FIGS. 22-24 are display screens that can be used by the money manager 130 to monitor remittance transactions, namely a monitoring by bank screen 650 (FIG. 22), a bank remittance list screen 660 (FIG. 23), and a Request for Cancellation Screen 670 (FIG. 24). Business Function: These screens 650, 660 and 670 are available in the bank interface to enable bank users to supervise the bank in/out transactions and change the transactions' status according to whether transaction requests for cancellation are approved or rejected. The bank monitoring screen 650 enables bank user to monitor all remittance transaction. The bank remittance list screen screen 660 enables bank user to change the transactions' status to paid or unpaid. The bank request for cancellation screen enables bank users to approve or reject the cancellation requests.

Filtering: Using the screen filtering criteria to limit the results just to the user's need. Some of the filtering criteria are selected from a picklist and calendar icons and some are entered into the designated fields in the 3 screen 650, 660, 670.

Clicking the Search button will view the results; clicking Clear will empty the entry fields from their data and reload al transaction that inserted in the current date.

Results: Bank Monitor screen/General tab displays the following information; BPMF SSN, Transaction Reference Number, Subscriber Name, Mobile Number, Beneficiary Name, Transaction Status, Amount From/To and Transaction Date From/To. The output (e.g., display, report) filtering criteria can be by any one or more of the displayed fields of bank file no., transaction ref. no., amount, currency, subscriber, beneficiary, transaction date, status, or transaction date According to an aspect of an embodiment, sending emails to the participating GSMs 120 is another facility that the mobile device remittance service provider 102 presents. Through the emailing service supported, users in mobile device remittance service provider 102 can keep updating GSMs 120 of the banks 130 and/or fees list.

The mobile device remittance computer system 100 is a revolutionary solution that would allow mobile operators to connect to virtually any bank worldwide. Computer system 100 that can be easily integrated with mobile operator 120 setup, and banking 130 infrastructure allowing seamless connection between the two parties. The features include:
 Simple: Ability to send money with an easy to use application on the phone, or by using standard SMS and USSD commands on basic handsets.
 Secure: Customer account is protected with multi-level PIN code; all transactions are encrypted throughout the transaction flow.
 Convenient: no need for the customer to travel to urban areas to cash out, no need to queue at bank lines, notification of transfer status.
 Cost Effective: Lower transaction fees.

The mobile device remittance computer system 100 is a solution that connects mobile network operators (MNO) 120 to banking community 130 throughout by utilizing the SWIFT network. The MNO will only need to have one connection to the mobile device remittance service operator 102 hub to get connected to financial network. In other words, the mobile device remittance service provider computer 102 transforms remittance transaction data from a mobile device into financial SWIFT network compliance transaction data.

Mobile Operators can sign only an agreement with the mobile device remittance service provider 102 and will have immediate access to banks within SWIFTNET worldwide. mobile device remittance service provider 102 is a state of the art financial hub that would allow both MNO and banks to perform their business as usual, and also to provide additional services to their customers, while being fully compliant and regulated according to both telecommunication regulatory authorities and central banks.

The mobile device remittance service provider 102 is fully equipped with AML/CFT services and mobile device remittance service provider 102 can substantially guarantee transaction integrity to receiving party, leaving the customer with extreme comfort.

In most cases, the MNO will need only to integrate the traditional channels (SMS/USSD or Java app) and provide a registration process to connect some type of mobile wallet application to execute KYC and accept cash. Banks will only need to connect to SWIFTNET and have FileAct enabled.

The system is equipped with different connectors, allowing both operators and banks to launch the services almost in no time. The bank will only need to be connected to SWIFTNET and having FileAct enabled to receive the transactions.

The bank interface can be deployed at the bank sites, and can be used as a client application to process the incoming transactions, while the operator can connect to the mobile device remittance service provider 102 using online webservices or batch file.

The mobile device remittance computer system 100 is as secure as banking framework, where traffic between all parties is signed and encrypted using highest security standards.

The mobile device remittance computer system 100 allows mobile operator 120 customer 122 to transfer money to a foreign end user through a financial institution.

The mobile device remittance computer system 100 offers an immediate reach to the financial and banking community through a single technical and commercial interface by being fully integrated and certified by SWIFTNET.

Transaction Life Cycle:

The transaction will be initiated from the mobile operator customer, and then transmitted to the mobile device remittance service provider 102 which will convert it and route it to destination bank over SWIFT.

The below operations are a high level presentation of the processes taking place to complete a transfer transaction.
 I. Subscription: Subscriber sends subscription command to subscribe to the service.
 II. Subscription and KYC (Know Your Customer) is activated by MNO 120.
 III. Money Transfer Command Sent: This function enables the subscriber to transfer money up to a certain limit as per prefixed limits and in compliance with regulatory mandatory limits.
 IV. Verification: The verification on balance and password of the subscriber will be performed by the MNO. The customer will be notified by an acknowledgment and a security code 300 of the transaction. A unique security code 300 assigned to the subscriber: A security code 300 is assigned to the mobile payment, this number is going to be considered the track number for the mobile payment. Other notifications: The MNO is going to notify the customer with SMS in case of insufficient balance and incorrect format.

Bulks of Money Transfer Orders: After receiving sent commands from subscribers, the MNO 120 sends bulk transactions in text files in one single Mobile Payments Format (MPF) file.

Example of BMPF 402 file:

300|USD|ABC|Juan Carlos|123456|

Amount|Currency|Bank ID|Beneficiary Name|Reference No

Pushing Bulked File: The MNO 120 will push the bulk files within defined time intervals.

The system will automatically validate the transaction details and encapsulate it to meet the SWIFT messaging standards. Then will ensure delivery to receiving bank and update the MNO with the transaction status upon completion.

The process of having mobile operators connected to SWIFTNET is unique by being a system integrator that can connect a third party to SWIFT network. The Mobile Operator does not have to do any special arrangements to connect "Indirectly" to SWIFT network, where the mobile device remittance service provider 102 will translate the requests into SWIFT compatible FileAct messages, then deliver it to receiving banks 130. The transaction will be delivered to the destination bank using the SWIFT BIC code as an identifier along with the country code. The mobile operator will send the agreed codes to identify the country and destination bank, and the mobile device remittance service provider 102 will do the translation into proper FileAct/BIC and perform routing to send the transaction to its destination. In other words, the mobile device remittance service provider computer 102 is a business computer to business computer gateway.

A method of outsourcing by a mobile network operator (MNO) a mobile device remittance service, is provided by registering by MNOs in a plurality of first countries subscribers of the MNOs for mobile device remittance to beneficiaries in second countries; configuring a server hub to computer interface with the MNOs in the first countries and to banks in the second countries; generating by the MNOS in the first countries remittance transactions, each transaction associated with a mobile device number and a security code; receiving a bundle of the remittance transactions from the MNOs and desegregating the remittance transaction by second country and by banks of the second country; converting the desegregated remittance transactions into financial regulatory compliant transactions on the second country and bank of the second country basis, and supporting remittance to the beneficiaries at the banks in the second countries according to the generated security code.

FIGS. 25A-25D are user interface computer display screens for managing administrative users of the mobile device remittance computer system, according to an embodiment of the invention. According to an aspect of an embodiment, the server hub 102 also manages administrative users of the system 100 on basis of a user (or group) name, user email, user approve status (active, inactive, warning), user action (remittance transaction related actions, such as deleting a fee, adding a fee, accepting or dispensing money, initiating or completing remittance transaction), permission and/or on basis of MNO 120, server hub 102 and/or bank 130, to meet the financial regulatory burden.

According to an aspect of an embodiment of the invention, the technologies to implement the embodiments include one or more of Extjs (2008), MSMQ integration, WCF Services, MICROSOFT WINDOWS SERVER 2008 and SQL 2008. However, the embodiments are not limited to these technologies and other technologies can be used to implement the embodiments.

Figure 26:
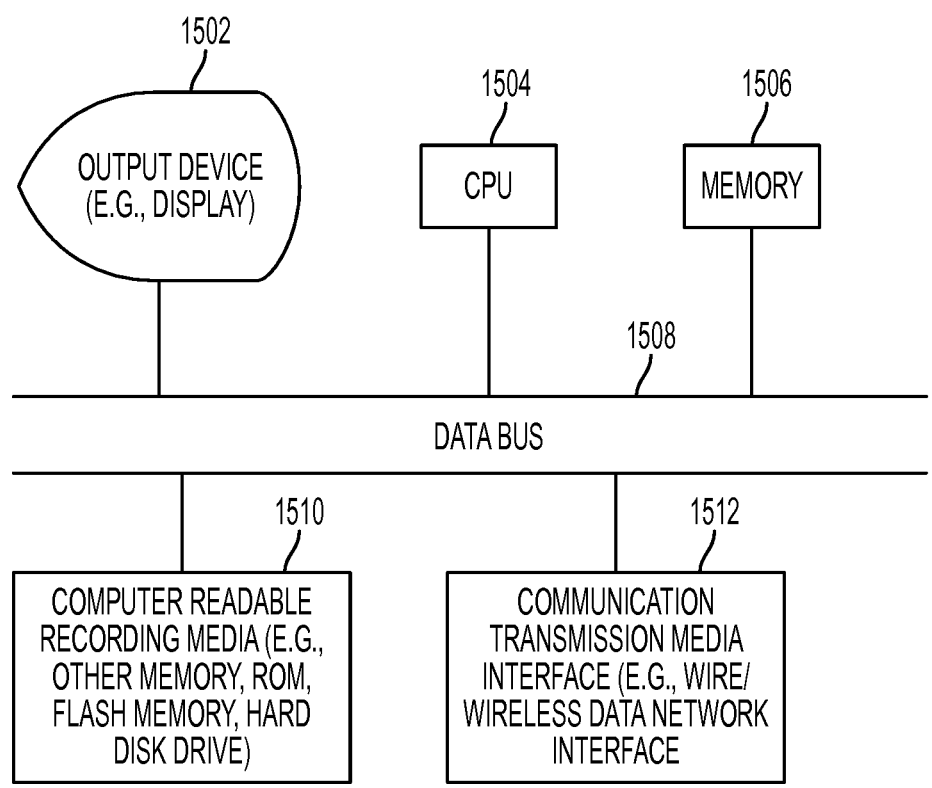
FIG. 26 is a functional block diagram of a computer for the embodiments of the invention.

FIG. 26 is a functional block diagram of a computer for the embodiments of the invention, namely the computer is an example of a mobile device remittance service provider computer 102. In FIG. 26, the computer can be any computing device. Typically, the computer includes an output device 1502, for example, a display to display a user interface or output information, printer, a cash dispenser, etc. A computer controller 1504 (e.g., a hardware central processing unit) executes instructions (e.g., a computer program or software) that control the apparatus to perform operations. Typically, a memory 1506 stores the instructions for execution by the controller 1504. According to an aspect of an embodiment, the apparatus reads/writes/processes data of any computer readable recording media 1510 and/or communication transmission media interface 1512. The display 1502, the CPU 1504 (e.g., hardware logic circuitry based computer processor that processes instructions, namely software), the memory 1506, the computer readable media 1510, and the communication transmission media interface 1512 are in communication by the data bus 1508.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatuses described (e.g., the computers 102, 120, 124, 128 and 130, etc.) can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A process by at least one computer server to validate cash remittance transaction messages by a mobile device of a subscriber of a mobile network operator (MNO) for Anti-Money Laundering (AML) and/or Combating Financing of Terrorism (CFT), the process by the at least one computer server comprising:
by at least one hardware processor of the at least one computer server that executes instructions stored in at least one memory to:
define data structures to store, in the at least one memory, information indicating correspondences, per cash remittance transaction initiated by the mobile device of the subscriber of the MNO in a sender country to a beneficiary in a receiver country, of:
an MNO code identifying the MNO in the sender country,
a subscriber mobile device number of the mobile device of the subscriber of the MNO in the sender country,
a beneficiary mobile number of a mobile device of the beneficiary of the cash remittance transaction in the receiver country,
a beneficiary bank interface code (BIC) of a bank for the beneficiary in the receiver country, and
a security code formed of tracking fields of the MNO code, a transaction random number, the beneficiary BIC, the sender country code and the receiver country code,
control generation of cash remittance transaction messages, a cash remittance transaction message including at least the stored information indicating the correspondences including the security code in response to the initiated cash remittance transaction;
implement at least three computer implemented interfaces corresponding to at least three transaction queues of cash remittance transaction messages accessible by computer implemented interfaces of the MNO in the sender country and banks in the sender and receiver countries to,
push and pull the cash remittance transaction massages to and from the at least three transaction queues corresponding to the MNO in the sender country, and the banks in the sender and receiver countries, respectively, in response to a validation status of a remittance transaction message,
obtain through a first MNO transaction queue, among the at least three transaction queues, a bundle of the cash remittance transaction messages from the MNO in the sender country,
segregate the bundle of the cash remittance transaction messages into segregated cash remittance transaction messages on basis of banks in the receiver country;
profile a cash remittance transaction message among the cash remittance transaction messages for the AML and/or CFT processing, by filtering the tracking fields in the security code included in the cash remittance transaction message,
perform a validation of a cash remittance of the cash remittance transaction message to the bank for the beneficiary in the receiver country, according to the profiling, and
in response to a valid status according to the validation, push a validated cash remittance transaction message to a validated transaction queue among the at least three transaction queues,
wherein the validated cash remittance transaction message is pulled, through the computer implemented interface of the bank for the beneficiary in the receiver country, from the validated transaction queue to transmit, according to a Society for Worldwide Interbank Financial Telecommunication (SWIFT) messaging standard, information of the obtained validated cash remittance transaction including the BIC of the bank for the beneficiary in the receiver country, to cause settlement by the bank of the beneficiary of the cash remittance,
in response to a settlement status of the cash remittance, push a settled validated cash remittance transaction message to a second MNO transaction queue among the at least three transaction queues to display the settled validated cash remittance transaction message of the MNO.

2. The method according to claim 1, wherein
the cash remittance transaction message further includes, a local currency for the MNO in the sender country and a destination currency of the bank for the beneficiary in the receiver country, and
the validated cash remittance transaction message only includes the destination currency as a redemption currency.

3. The method according to claim 2, further comprising reporting the cash remittance to the beneficiary mobile device number and to the subscriber mobile device number.

4. The method according to claim 1, further comprising:
by the server trace the cash remittance transaction messages in the at least three queues by the filtering on basis of the security code.

5. The method according to claim 1, wherein the at least three queues are web service based queues.

6. An apparatus to validate cash remittance transaction messages by a mobile device of a subscriber of a mobile network operator (MNO) for Anti-Money Laundering (AML) and/or Combating Financing of Terrorism (CFT), the apparatus comprising:
at least one memory; and
at least one processor configured to execute instructions stored in the at least one memory to:
define data structures to store, in the at least one memory, information indicating correspondences, per cash remittance transaction initiated by the mobile device of the subscriber of the MNO in a sender country to a beneficiary in a receiver country, of:
an MNO code identifying the MNO in the sender country, a subscriber mobile device number of the mobile device of the subscriber of the MNO in the sender country, a beneficiary mobile number of a mobile device of the beneficiary of the cash remittance transaction in the receiver country, a beneficiary bank interface code (BIC) of a bank for the beneficiary in the receiver country, and a security code formed of tracking fields of the MNO code, a transaction random number, the beneficiary BIC, the sender country code and the receiver country code, control generation of cash remittance transaction messages, a cash remittance transaction message including at least the stored information indicating the correspondences including the security code in response to the initiated cash remittance transaction;

implement at least three computer implemented interfaces corresponding to at least three transaction queues of cash remittance transaction messages accessible by computer implemented interfaces of the MNO in the sender country and banks in the sender and receiver countries to, push and pull the cash remittance transaction massages to and from the at least three transaction queues corresponding to the MNO in the sender country, and the banks in the sender and receiver countries, respectively, in response to a validation status of a remittance transaction message, obtain through a first MNO transaction queue, among the at least three transaction queues, a bundle of the cash remittance transaction messages from the MNO in the sender country, segregate the bundle of the cash remittance transaction messages into segregated cash remittance transaction messages on basis of banks in the receiver country;

profile a cash remittance transaction message among the cash remittance transaction messages for the AML and/or CFT processing, by filtering the tracking fields in the security code included in the cash remittance transaction message, perform a validation of a cash remittance of the cash remittance transaction message to the bank for the beneficiary in the receiver country, according to the profiling, and in response to a valid status according to the validation, push a validated cash remittance transaction message to a validated transaction queue among the at least three transaction queues, wherein the validated cash remittance transaction message is pulled, through the computer implemented interface of the bank for the beneficiary in the receiver country, from the validated transaction queue to transmit, according to a Society for Worldwide Interbank Financial Telecommunication (SWIFT) messaging standard, information of the obtained validated cash remittance transaction including the BIC of the bank for the beneficiary in the receiver country, to cause settlement by the bank of the beneficiary of the cash remittance, in response to a settlement status of the cash remittance, push a settled validated cash remittance transaction message to a second MNO transaction queue among the at least three transaction queues to display the settled validated cash remittance transaction message of the MNO.

* * * * *